(12) United States Patent
Vasko et al.

(10) Patent No.: US 8,540,298 B2
(45) Date of Patent: Sep. 24, 2013

(54) VEHICLE CONSOLE TRAY ASSEMBLY

(75) Inventors: Melaina Vasko, Highland Township, MI (US); Thomas Mally, Beverly Hills, MI (US)

(73) Assignee: Nissan North America, Inc., Franklin, TN (US)

( * ) Notice: Subject to any disclaimer, the term of this patent is extended or adjusted under 35 U.S.C. 154(b) by 365 days.

(21) Appl. No.: 13/020,199

(22) Filed: Feb. 3, 2011

(65) Prior Publication Data

US 2012/0200105 A1  Aug. 9, 2012

(51) Int. Cl.
*B60R 7/04* (2006.01)

(52) U.S. Cl.
USPC ........................................ 296/24.34

(58) Field of Classification Search
USPC .......... 296/24.34, 70, 1.08, 39.1, 37.8, 37.12, 296/24.43, 37.3
See application file for complete search history.

(56) References Cited

U.S. PATENT DOCUMENTS

| | | | | |
|---|---|---|---|---|
| 5,466,028 A | | 11/1995 | Nicopolis | |
| 5,680,974 A | * | 10/1997 | Vander Sluis | 224/281 |
| 5,823,599 A | * | 10/1998 | Gray | 296/37.8 |
| 6,428,072 B1 | * | 8/2002 | Moore | 296/24.34 |
| 7,380,852 B2 | | 6/2008 | Vander Kuyl et al. | |
| 7,631,917 B2 | * | 12/2009 | Kwolek | 296/24.34 |
| 7,823,946 B2 | * | 11/2010 | Hamaguchi et al. | 296/37.12 |
| 7,854,457 B2 | * | 12/2010 | Tanner | 296/1.08 |
| 2007/0176448 A1 | * | 8/2007 | Spykerman et al. | 296/24.34 |
| 2007/0182201 A1 | * | 8/2007 | Gilleo et al. | 296/146.7 |
| 2011/0001328 A1 | * | 1/2011 | Carnevali | 296/24.34 |

* cited by examiner

*Primary Examiner* — Glenn Dayoan
*Assistant Examiner* — Pinel Romain
(74) *Attorney, Agent, or Firm* — Global IP Counselors, LLP

(57) ABSTRACT

A vehicle interior trim assembly comprises first, second and third trim members. The first trim member has a first surface which includes a first mounting structure. The second trim member is positioned adjacent to the first trim member such that a first peripheral edge of the first trim member faces a second peripheral edge of the second trim member. The third trim member is more elastic than the first and second trim members and is coupled to and at least partially overlays the second trim member. The third trim member has a second surface including a second mounting structure, and a third peripheral edge of the third trim member extends beyond the second peripheral edge of the second trim member such that the second mounting structure of the third trim member engages the first mounting structure of the first trim member.

20 Claims, 29 Drawing Sheets

VEHICLE CONSOLE TRAY ASSEMBLY

BACKGROUND OF THE INVENTION

1. Field of the Invention

The present invention relates to a vehicle interior trim assembly, such as a vehicle console tray assembly. More specifically, the present invention relates to a vehicle interior trim assembly having a plurality of members, including an elastic member, which can generally be configured as a vehicle storage compartment, such as a vehicle console tray assembly.

2. Background Information

Vehicles typically have various types of storage locations, such as glove compartments, console compartments and console trays. The storage locations themselves are often aesthetically part of the interior trim of the vehicle, and are typically made of plastic or composite materials. Loose articles in the storage locations will often shift while the vehicle is travelling, causing the articles to contact or rattle against the walls or floors of the storage locations and thus make noise. Accordingly, it is common to include rubber mats or padding inside the storage locations to dampen the noise caused by moving articles in order to improve passenger comfort. However, conventional mats and padding used in storage locations are not aesthetically pleasing and may be inappropriate for use as a visible design element within a vehicle.

SUMMARY

In view of the state of the known technology, one aspect of the present invention is directed to a vehicle interior trim assembly comprising first, second and third trim members. The first trim member has a first surface which includes a first mounting structure. The second trim member is positioned adjacent to the first trim member such that a first peripheral edge of the first trim member faces a second peripheral edge of the second trim member. The third trim member is more elastic than the first and second trim members and is coupled to and at least partially overlays the second trim member. The third trim member has a second surface including a second mounting structure, and a third peripheral edge of the third trim member extends beyond the second peripheral edge of the second trim member such that the second mounting structure of the third trim member engages the first mounting structure of the first trim member.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
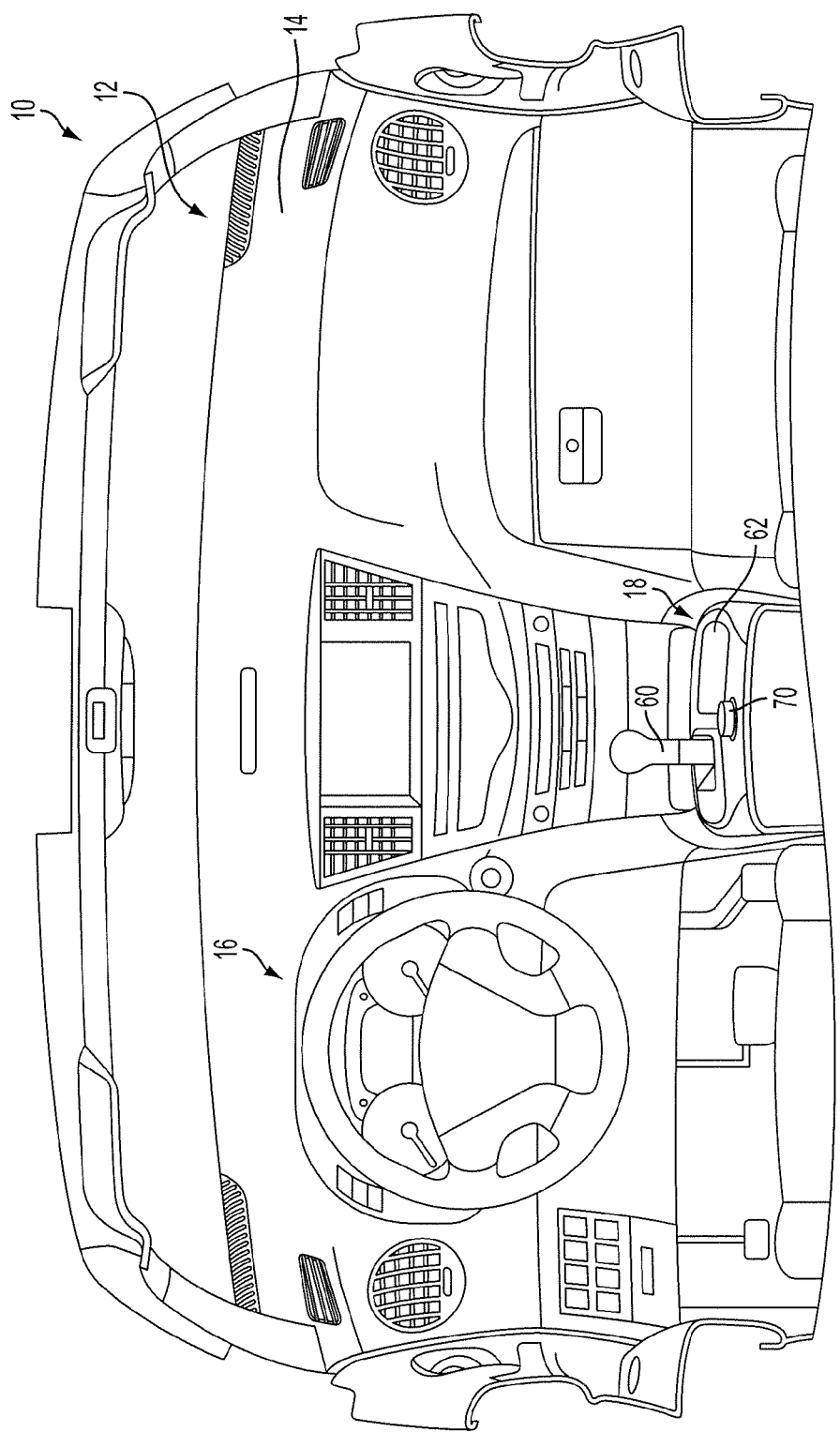
FIG. 1 is a perspective view of a vehicle passenger compartment including a vehicle console.
Figure 2:
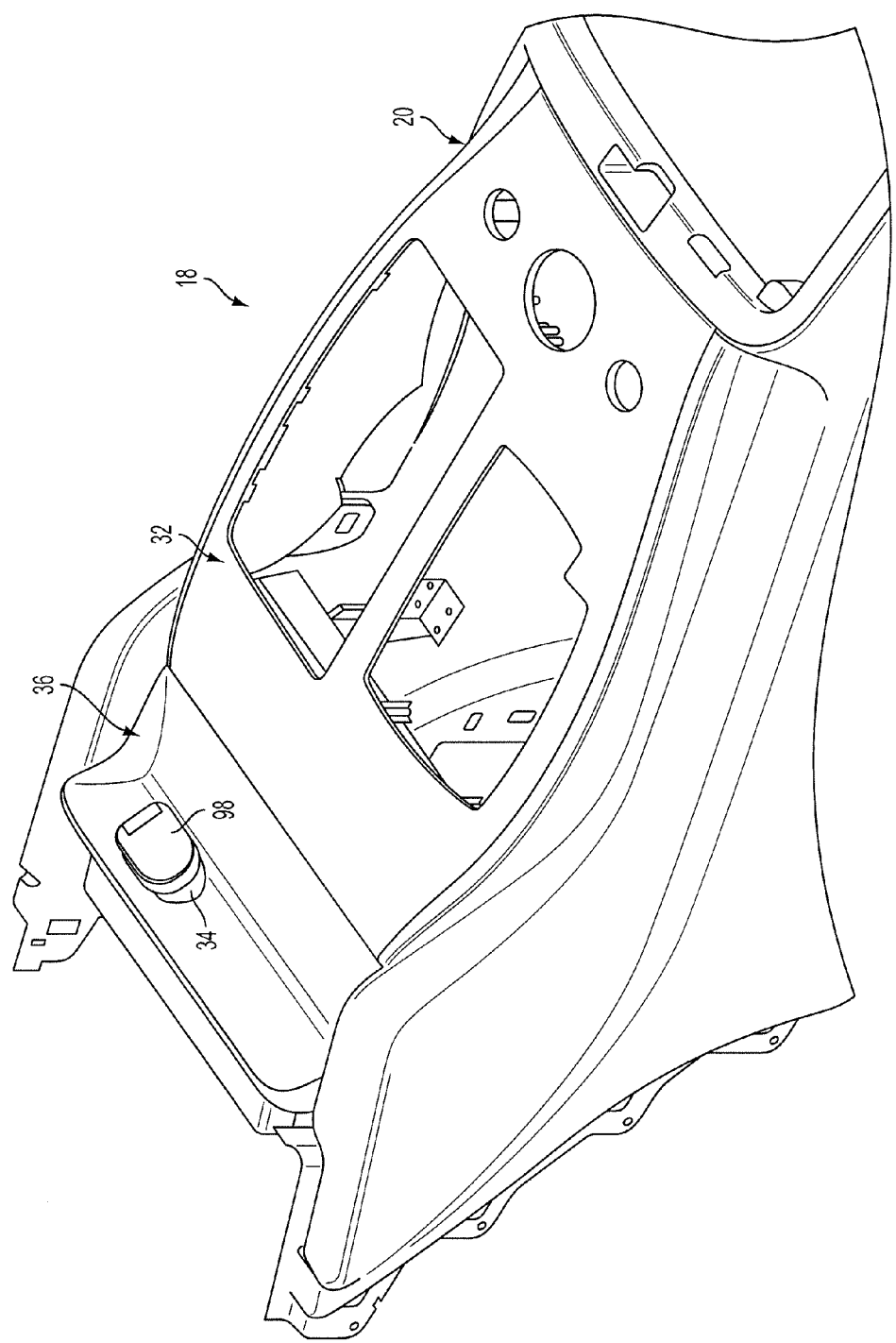
FIG. 2 is a perspective view of the vehicle console.
Figure 3:
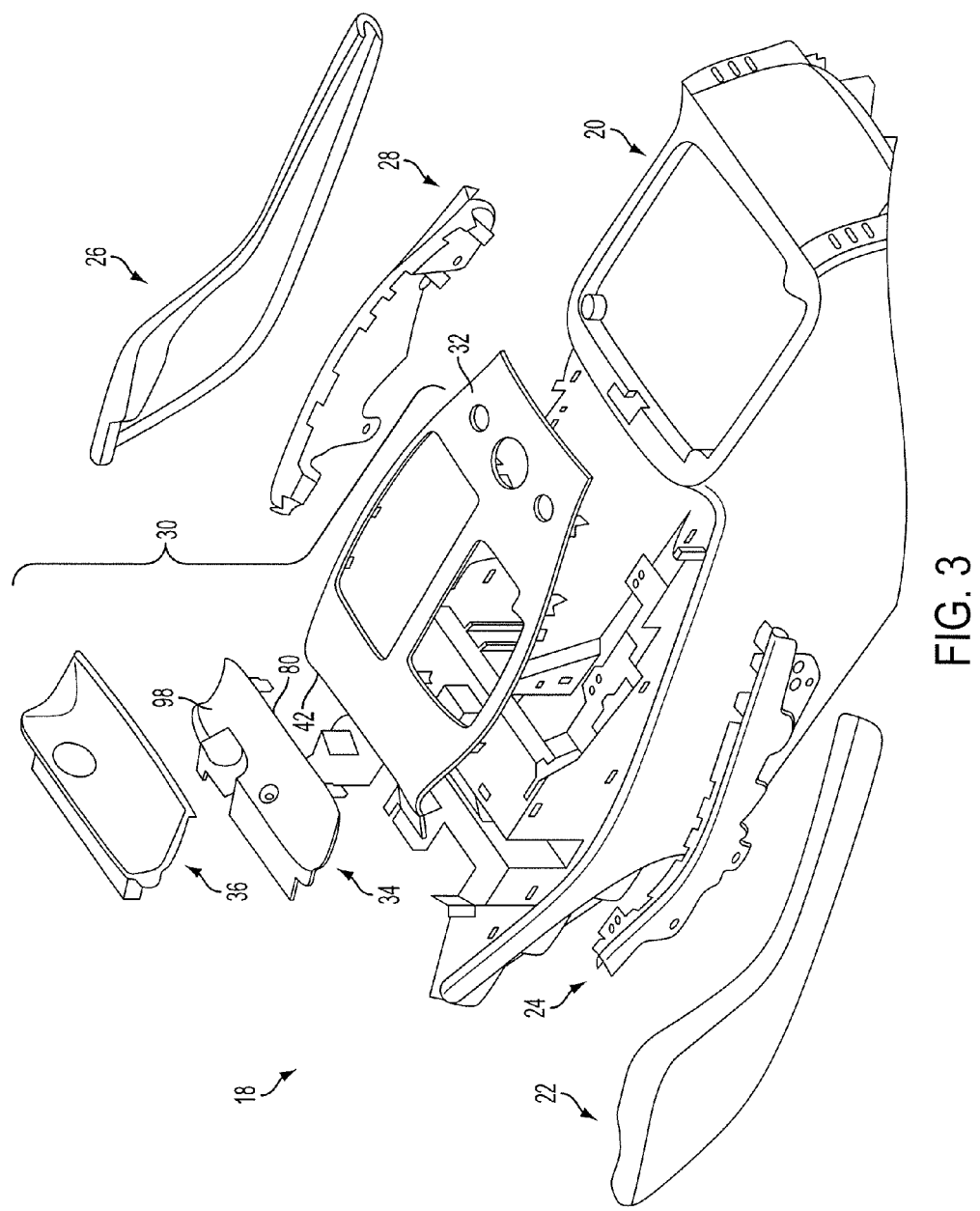
FIG. 3 is an exploded perspective view of the vehicle console.
Figure 4:
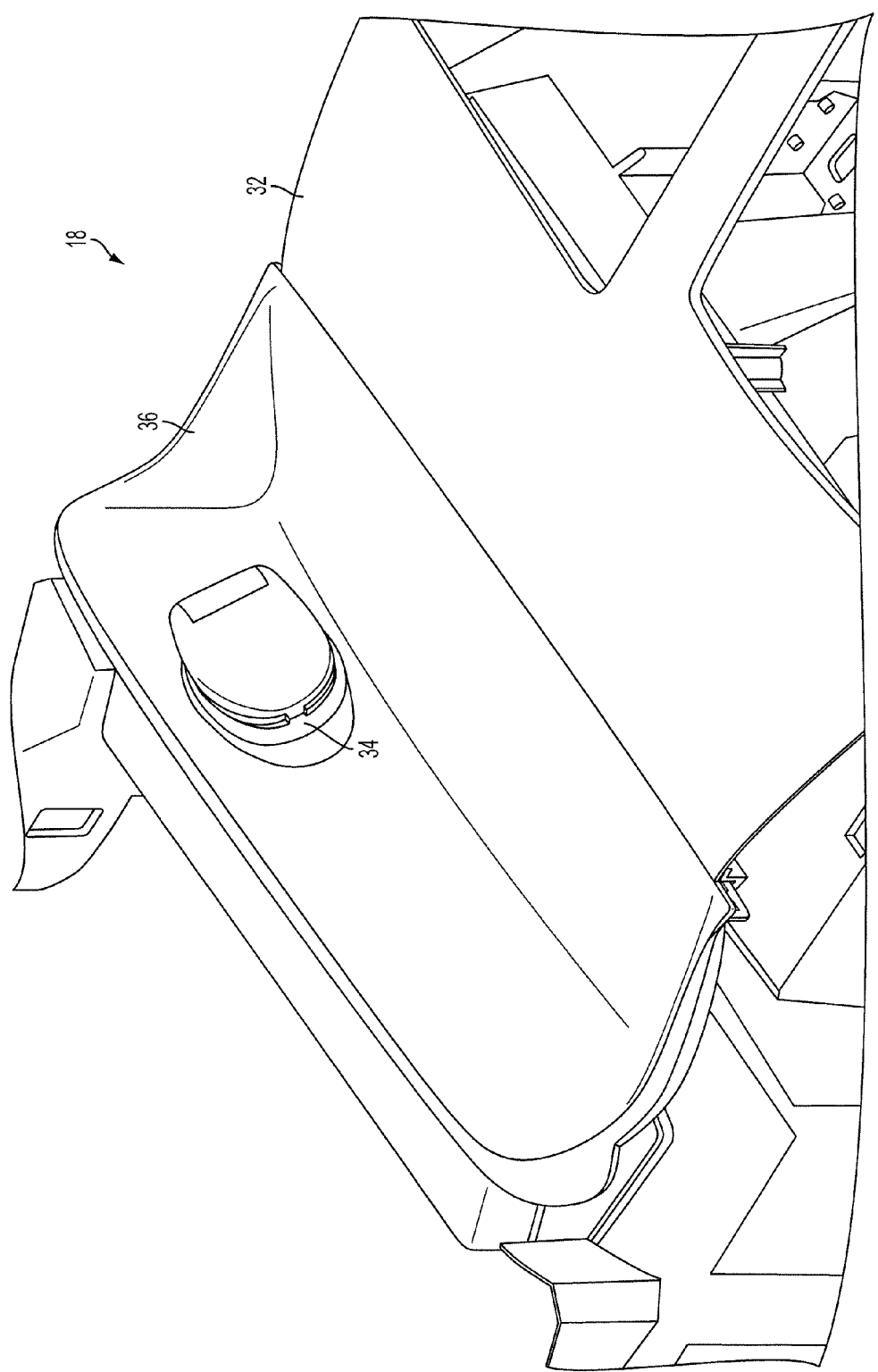
FIG. 4 is a detailed perspective view of a front portion of the vehicle console.
Figure 5:
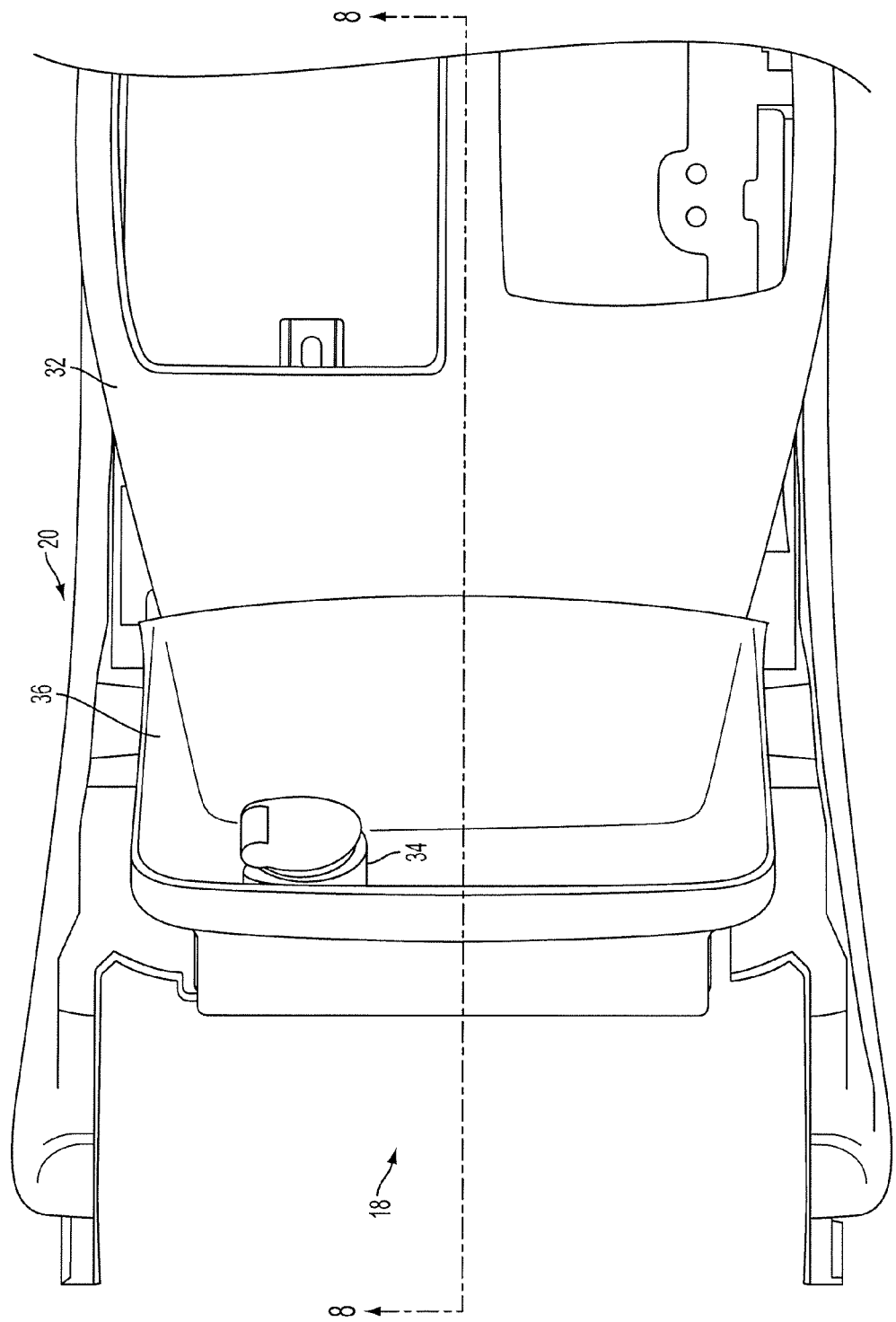
FIG. 5 is a top plan view of the front portion of the vehicle console.
Figure 6:
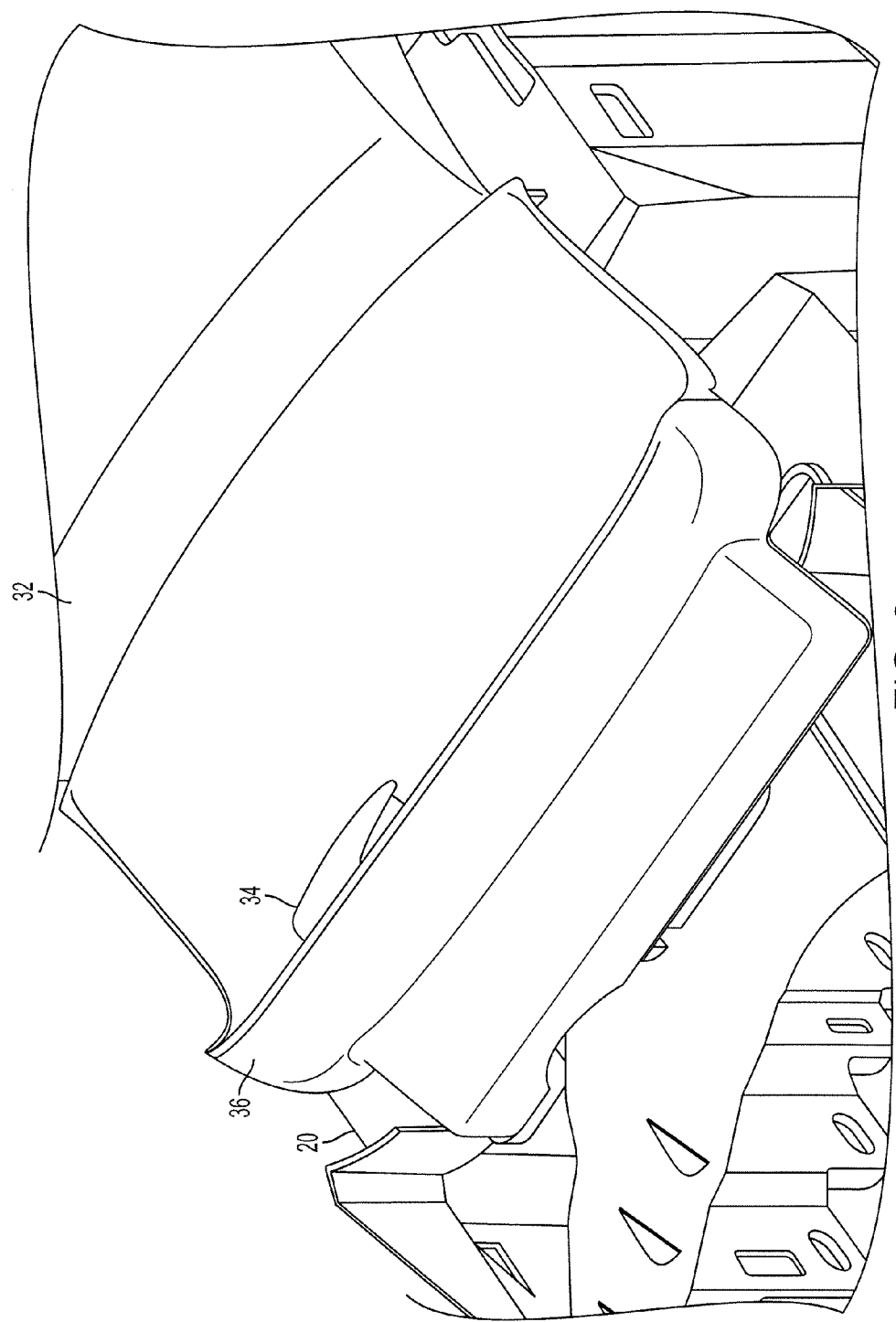
FIG. 6 is a rear perspective view of the front portion of the vehicle console.
Figure 7:
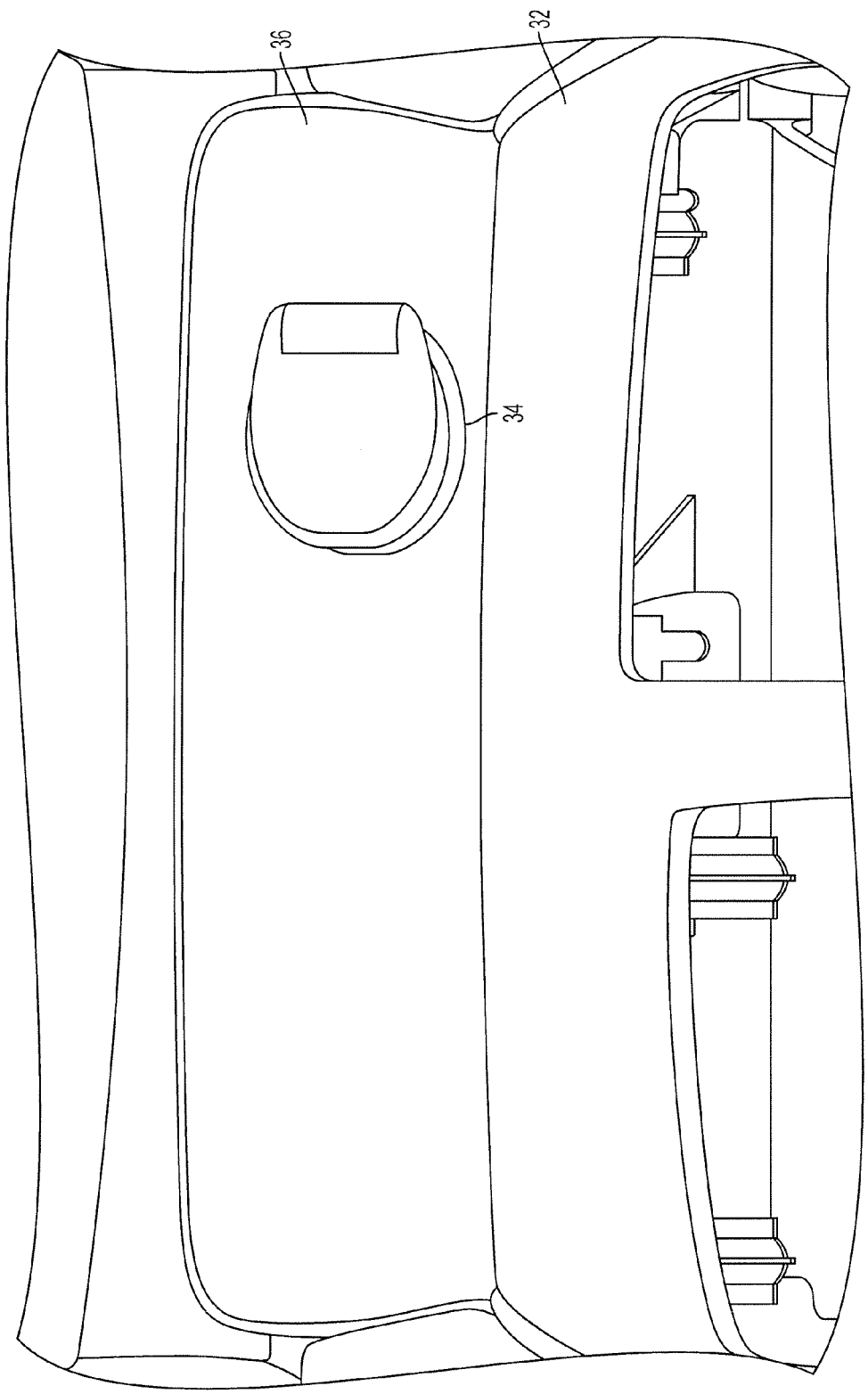
FIG. 7 is a detailed front elevational view of the front portion of the vehicle console.

Referring initially to FIGS. 1-3, a vehicle 10 has a passenger compartment 12 and a dashboard 14 generally at the front of the passenger compartment 12. The dashboard 14 typically includes an instrument panel 16 as indicated. Also, a vehicle console 18 can be present between the front seats of the vehicle 10 in the passenger compartment 12.

As shown in more detail in FIGS. 2 and 3, the vehicle console 18 includes a base portion 20, left side trim components 22 and 24, and right side trim components 26 and 28. The base portion 20, left side trim components 22 and 24, and right side trim components 26 and 28 can be made of plastics, composites or any other suitable materials or combination of suitable materials. The base portion 20, left side trim components 22 and 24, and right side trim components 26 and 28 can be secured together by snap-fitting, screws, or any other suitable fastening means.

The vehicle console 18 further includes a top trim component 30. The top trim component 30 can also be generally referred to as a vehicle interior trim assembly 30. The vehicle interior trim assembly 30 comprises a first trim member 32, a second trim member 34 and a third trim member 36. Further details of the first trim member 32 are shown in FIGS. 4-16.

As illustrated, the first trim member 32 has a first surface 38 that faces upward in the vehicle 10. The first surface 38 includes a first mounting structure 40 at the front peripheral edge 42 of the first trim member 32. The first trim member 32, including the first mounting structure 40, can be made of plastics, composites or any other suitable materials or combination of materials. The first trim member 32 and the first mounting structure 40 can be configured integrally with each other or alternatively, the first mounting structure 40 can be attached to the first trim member 32 by snap-fitting, adhesive, rivets, screws or any other suitable type of fastener.

As further shown, the first mounting structure 40 in this example is configured as a plurality of first mounting members 44, 46 and 48 that are positioned along the front peripheral edge 42 of the first trim member 32. In this example, the first mounting members 44 and 46 are located at opposite ends of the front peripheral edge 42 of the first trim member 32. The first mounting member 48 is located at the center of the front peripheral edge 42 of the first trim member 32. Also, the first mounting structure 40 can be configured to include any suitable number of mounting members. Alternatively, the first mounting structure 40 can be configured as a single mounting member that extends entirely along the peripheral edge 42 of the first trim member 32, or along only a portion of the peripheral edge 42 of the first trim member 32.

As indicated, each of the first mounting members 44, 46 and 48 of the first mounting structure 40 is further configured to have a U-shaped or substantially U-shaped cross-section to form a respective channel 50, 52 and 54. Each channel 50, 52 and 54 is open in a direction facing upward in the vehicle 10. Naturally, if the first mounting structure 40 is formed as a single mounting member, that single mounting member can include a single channel or a plurality of partitioned channels as desired. Furthermore, each of the mounting members of the first mounting structure 40 can be configured to have a single channel or a plurality of partitioned channels, depending on the sizes of the mounting members and respective channels.

The first trim member 32 further includes openings 56 and 58 through which can extend, for example, a gear shifter handle 60 and a closure panel 62 for a storage compartment such as a beverage container storage compartment (See FIG. 1). The first trim member 32 also includes openings 64, 66 and 68 that can accommodate, for example, various control dials 70 or buttons used to operate seat climate control systems and/or a drive train mode selection system (See FIG. 1). As further shown, a plurality of various projections 72 and clasps 74 extend downward from a second surface 76 of the first trim member 32 that faces downward in the vehicle 10. These projections 72 and clasps 74 mate with corresponding openings 76 and 78 (See FIG. 3) to secure the first trim member 32 to the base portion 20 of the vehicle console 18 by, for example, snap fitting or via screws, rivets and the like.

Figure 8:
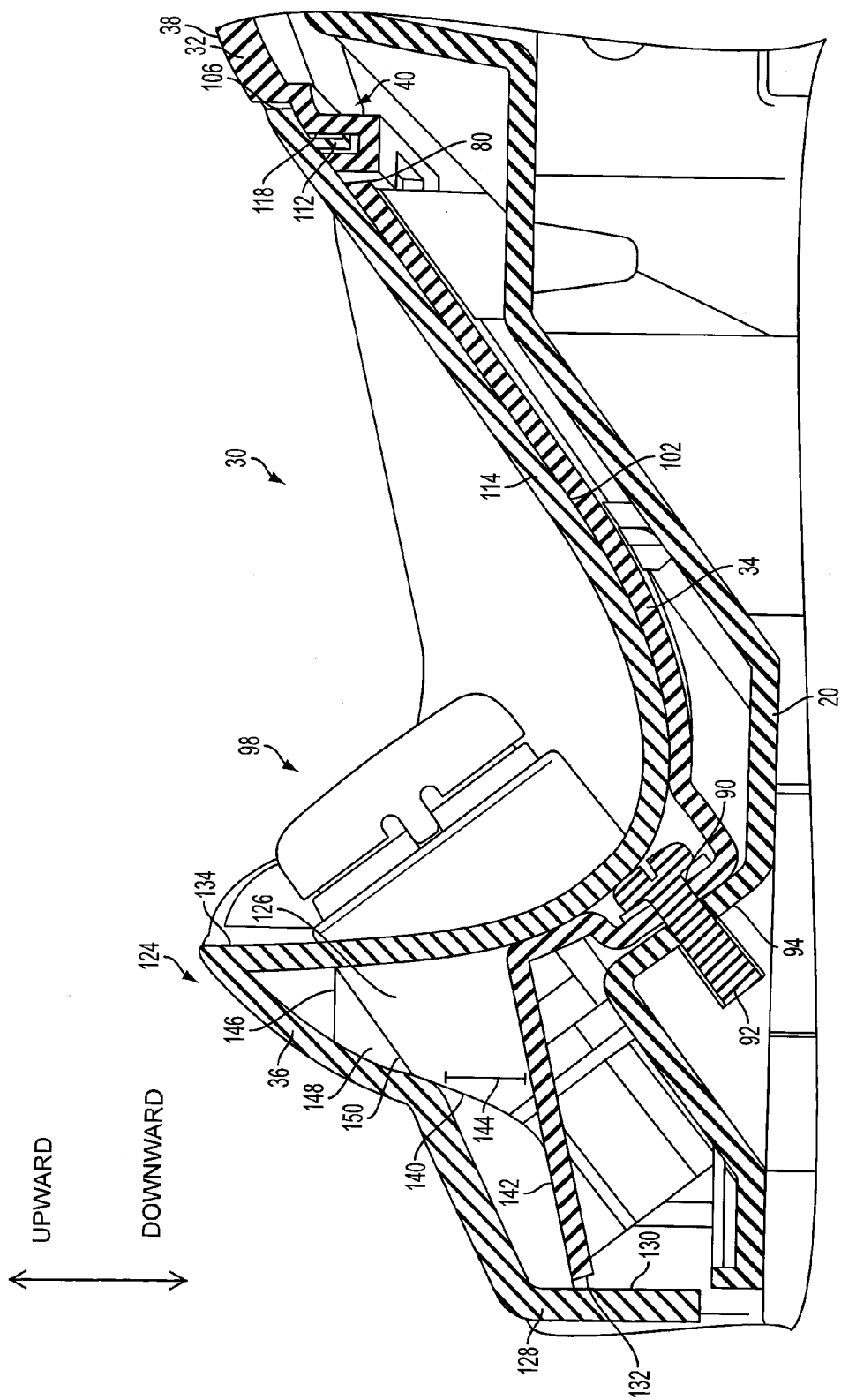
FIG. 8 is a cross-sectional view of the front portion of the vehicle console.
Figure 9:
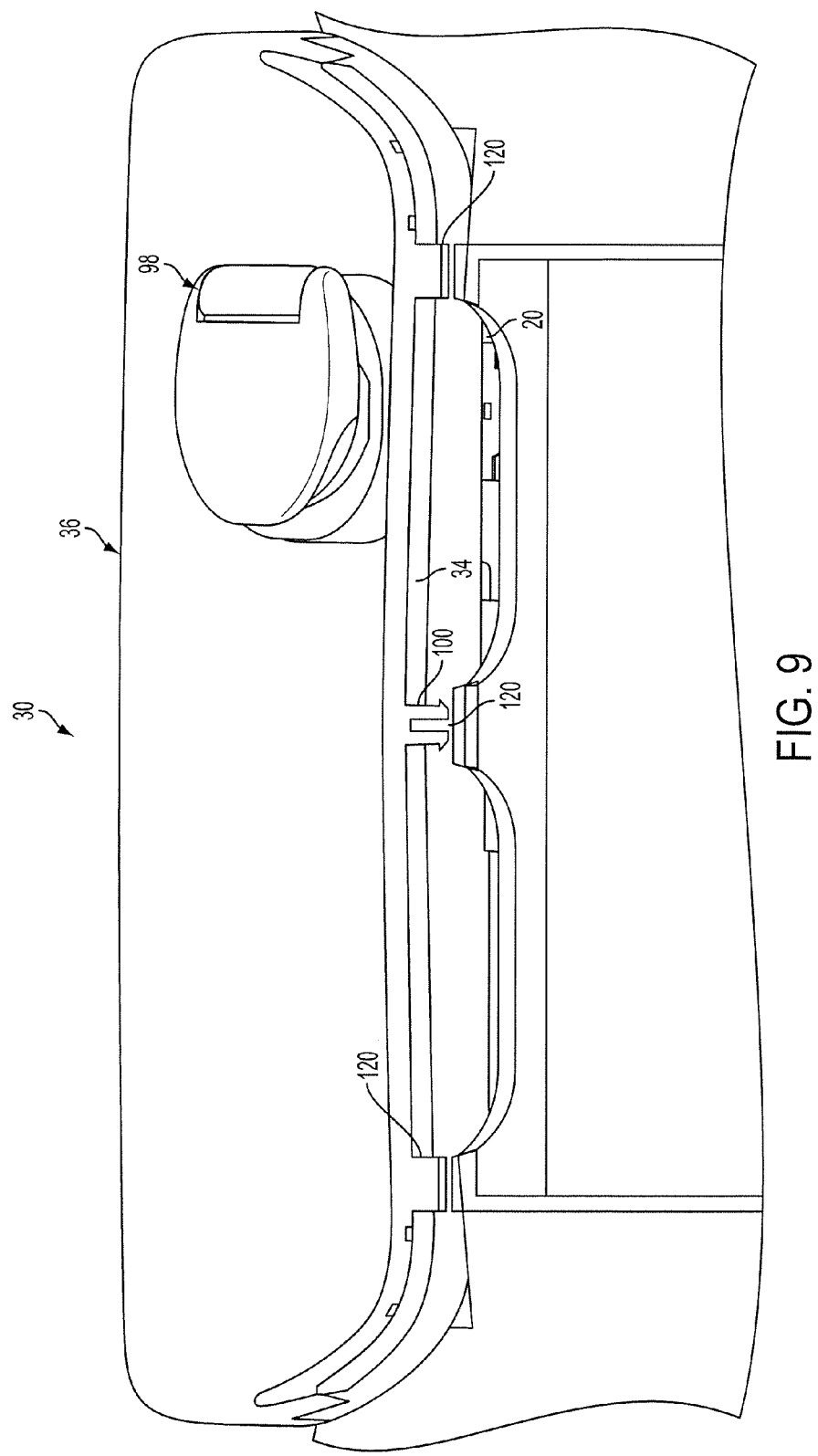
FIG. 9 is a detailed cross-sectional view of the front portion of the vehicle console.
Figure 10:
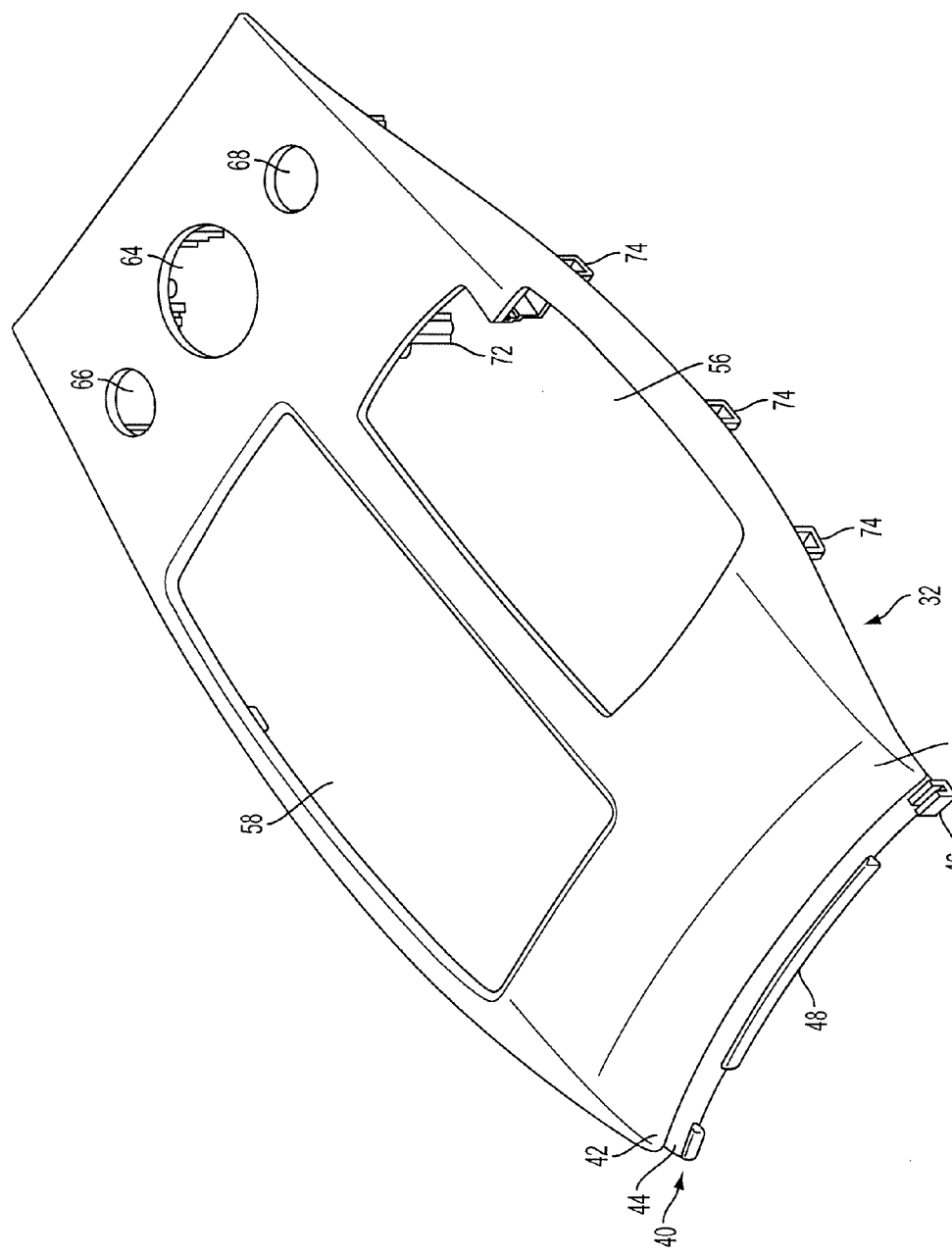
FIG. 10 is a perspective view of a first trim member of the vehicle console.
Figure 11:
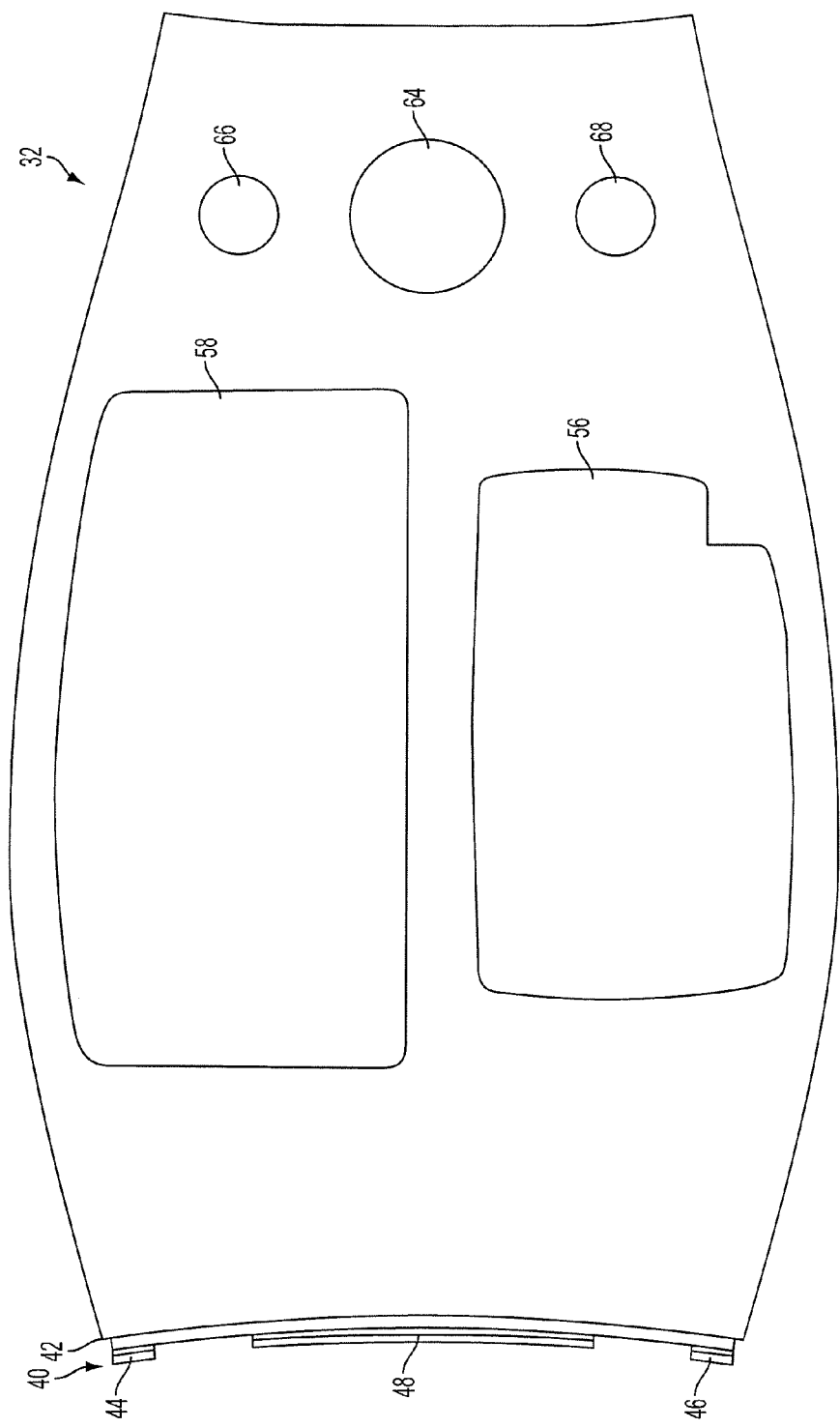
FIG. 11 is a top plan view of the first trim member.
Figure 12:
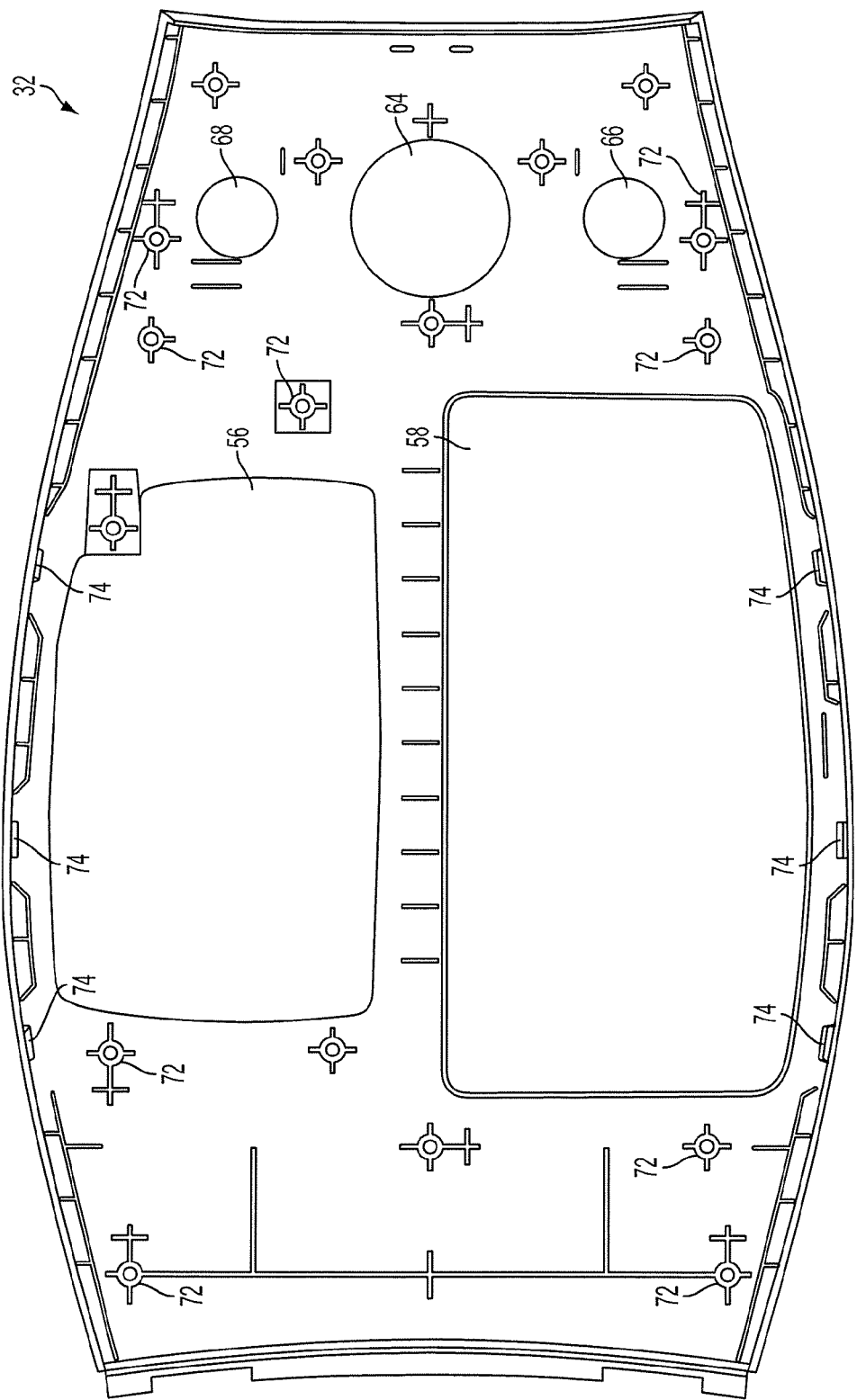
FIG. 12 is a bottom plan view of the first trim member.
Figure 13:
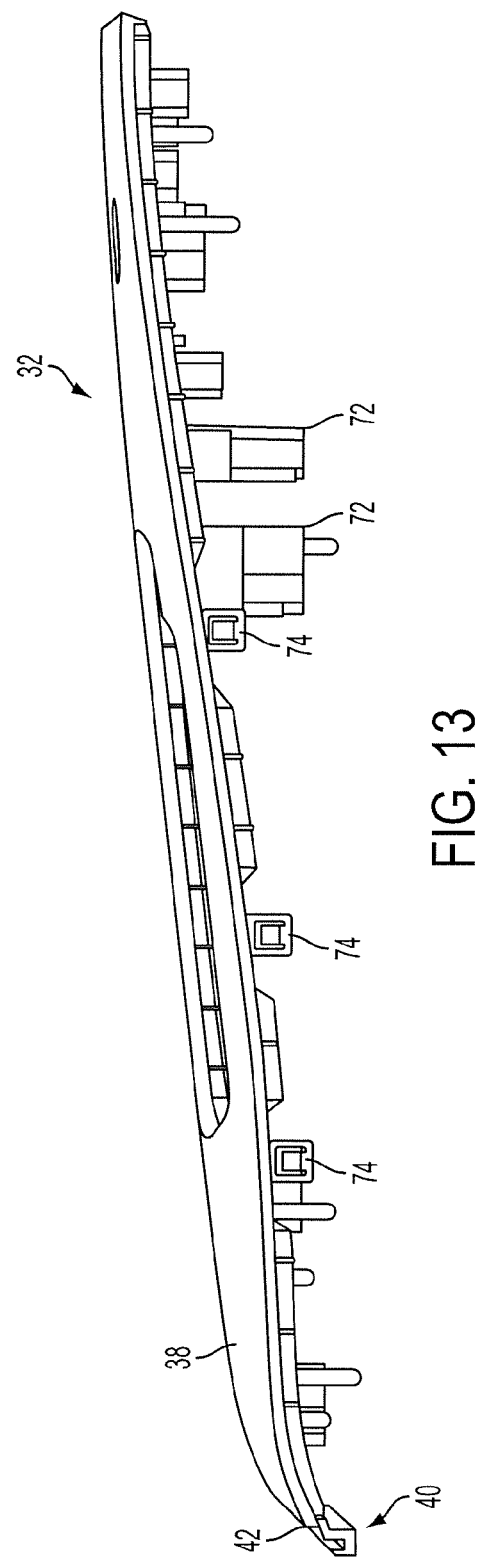
FIG. 13 is a side elevational view of the first trim member.
Figure 14:
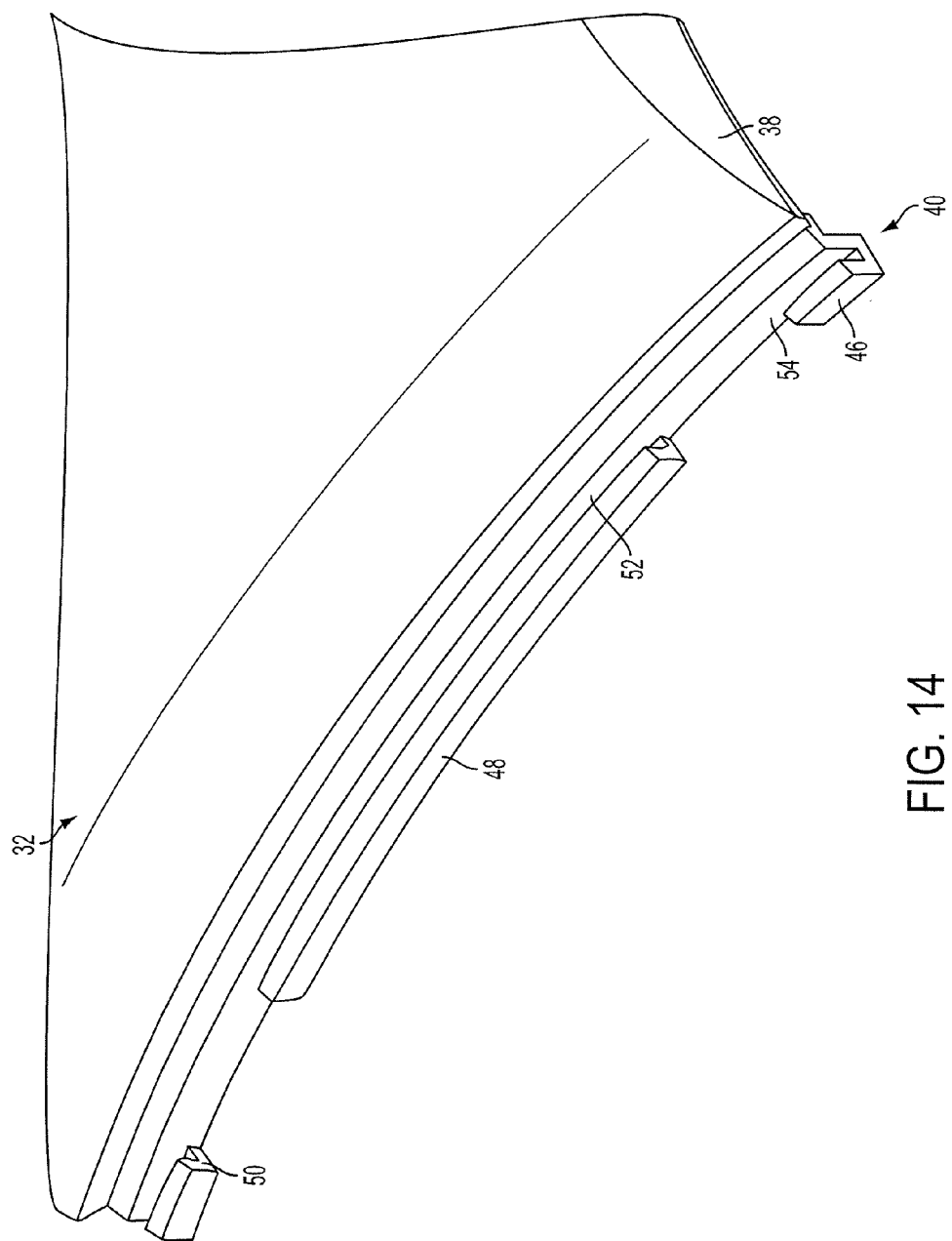
FIG. 14 is a detailed rear perspective view of a front end of the first trim member.
Figure 15:
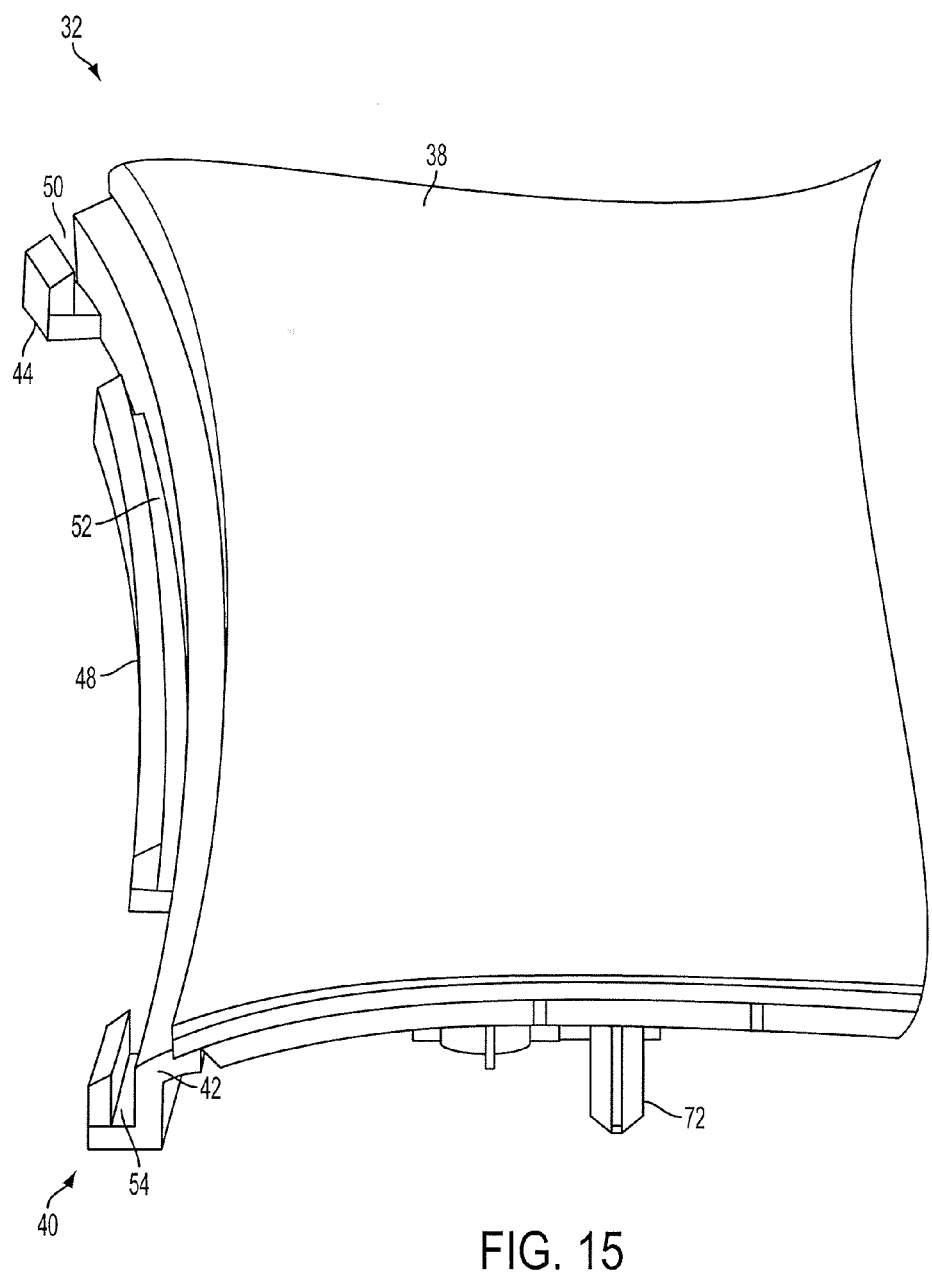
FIG. 15 is a detailed side perspective view of the front end of the first trim member.
Figure 16:
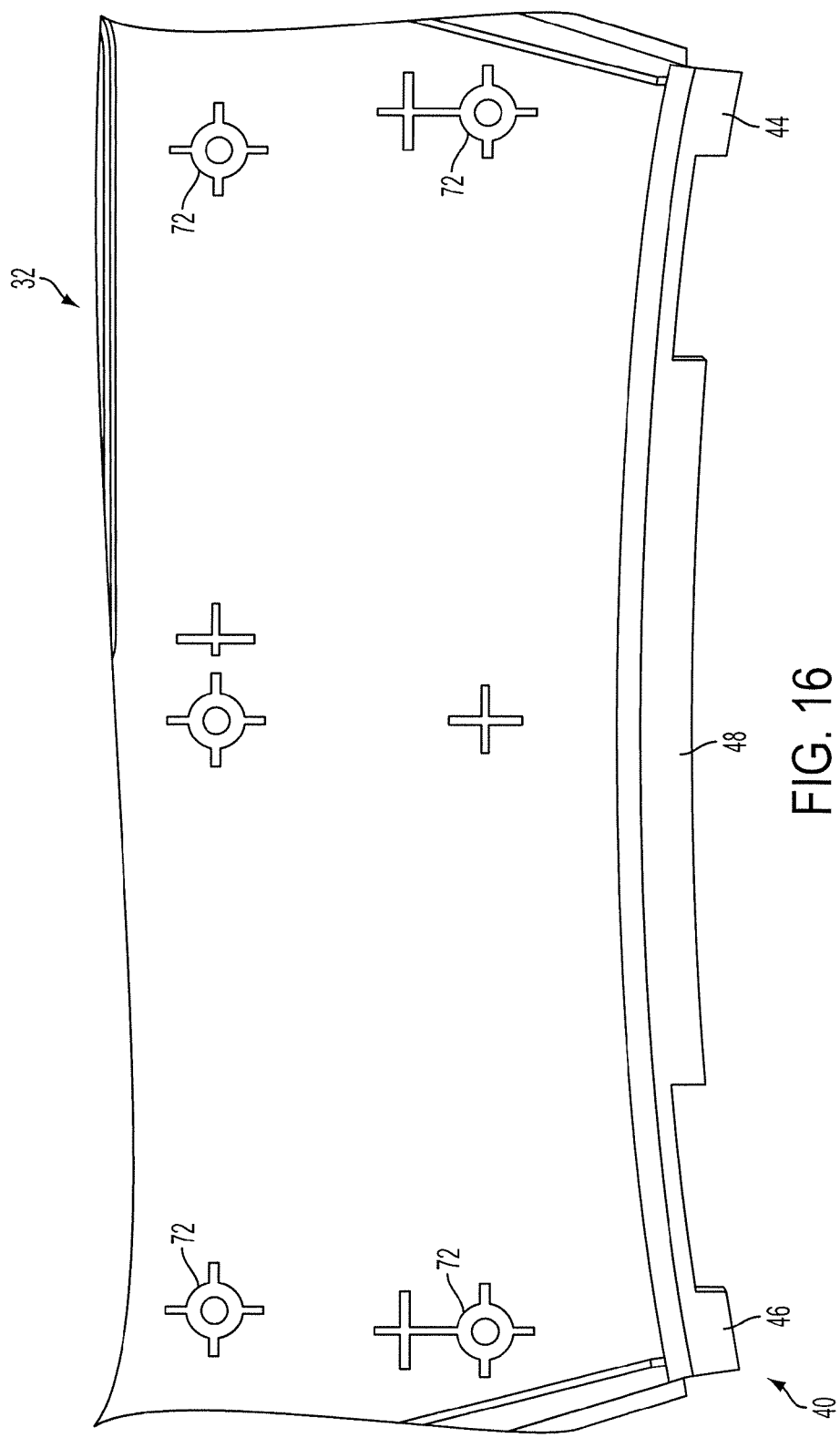
FIG. 16 is a detailed bottom view of the front end of the first trim member.
Figure 17:
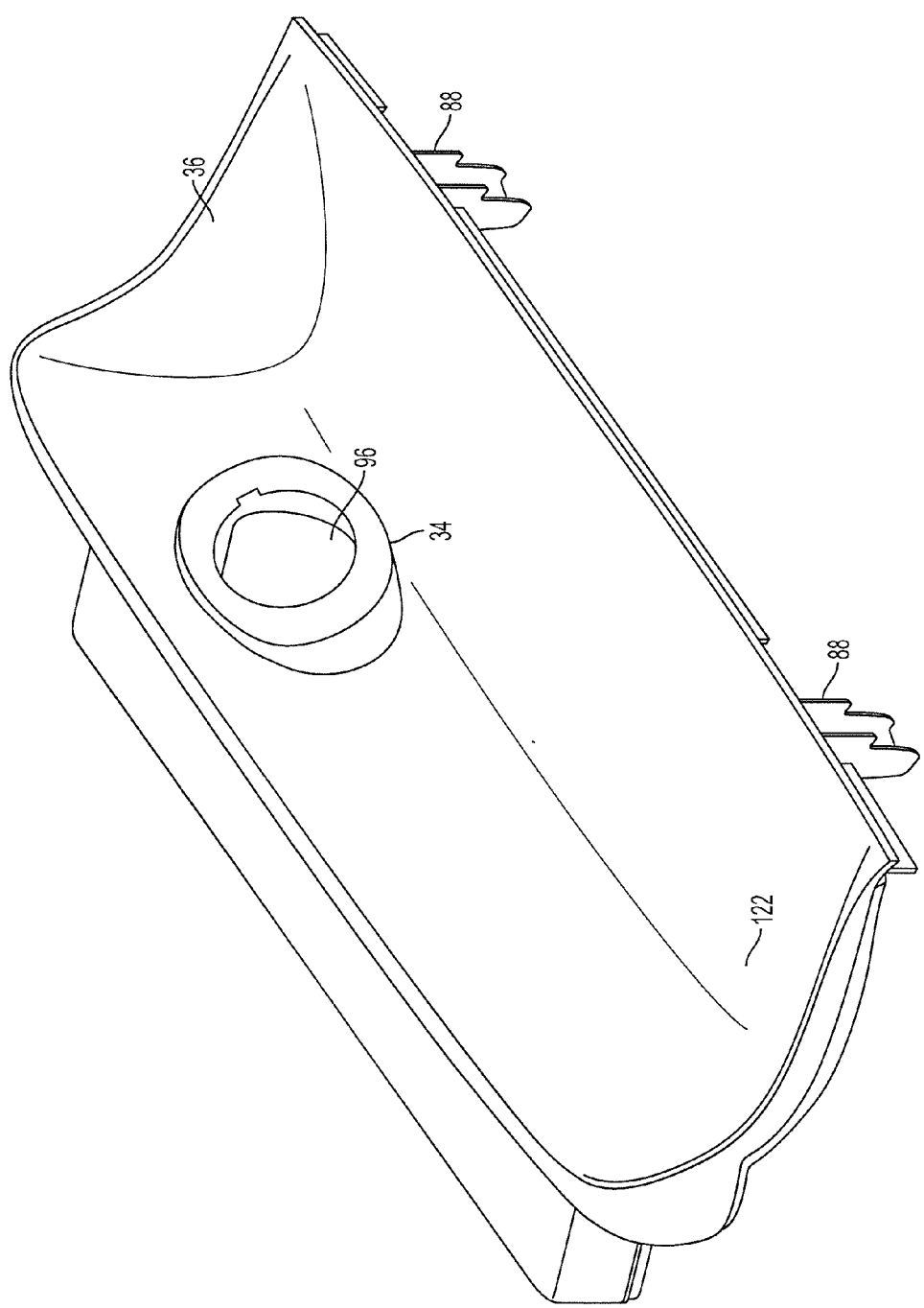
FIG. 17 is a front perspective view of second and third trim members of the vehicle console assembled together.
Figure 18:
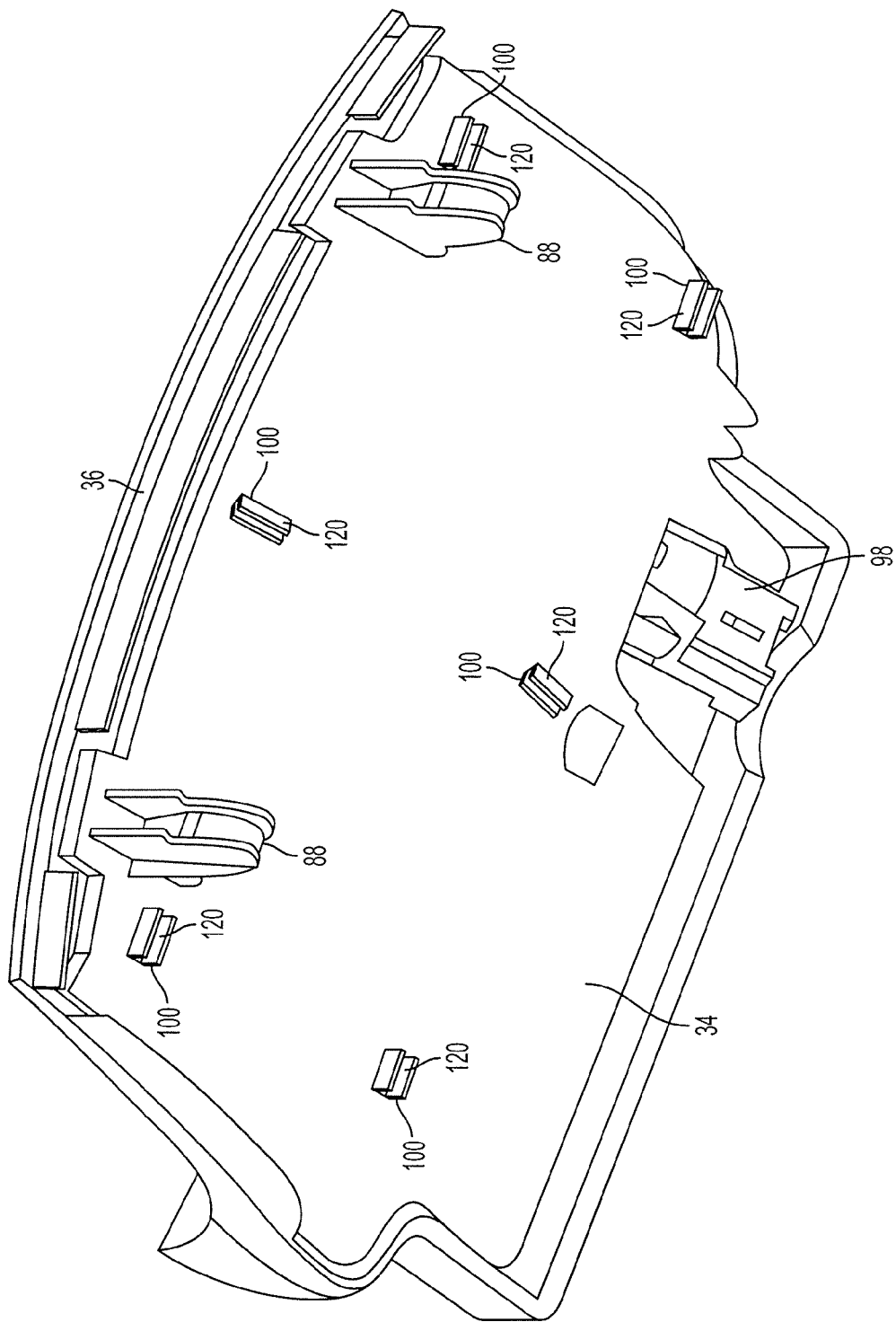
FIG. 18 is a bottom perspective view of the second and third trim members assembled together.
Figure 19:
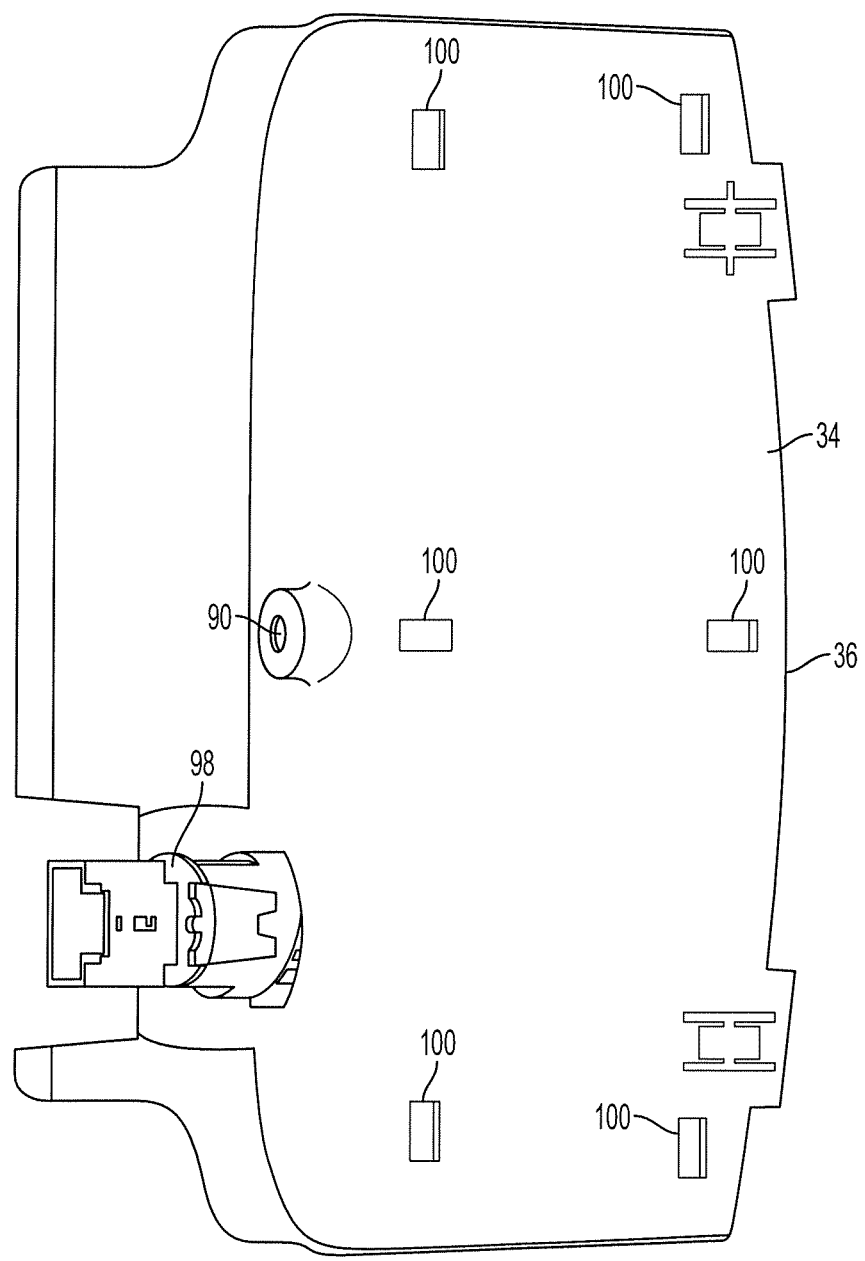
FIG. 19 is a bottom plan view of the second trim member.
Figure 20:
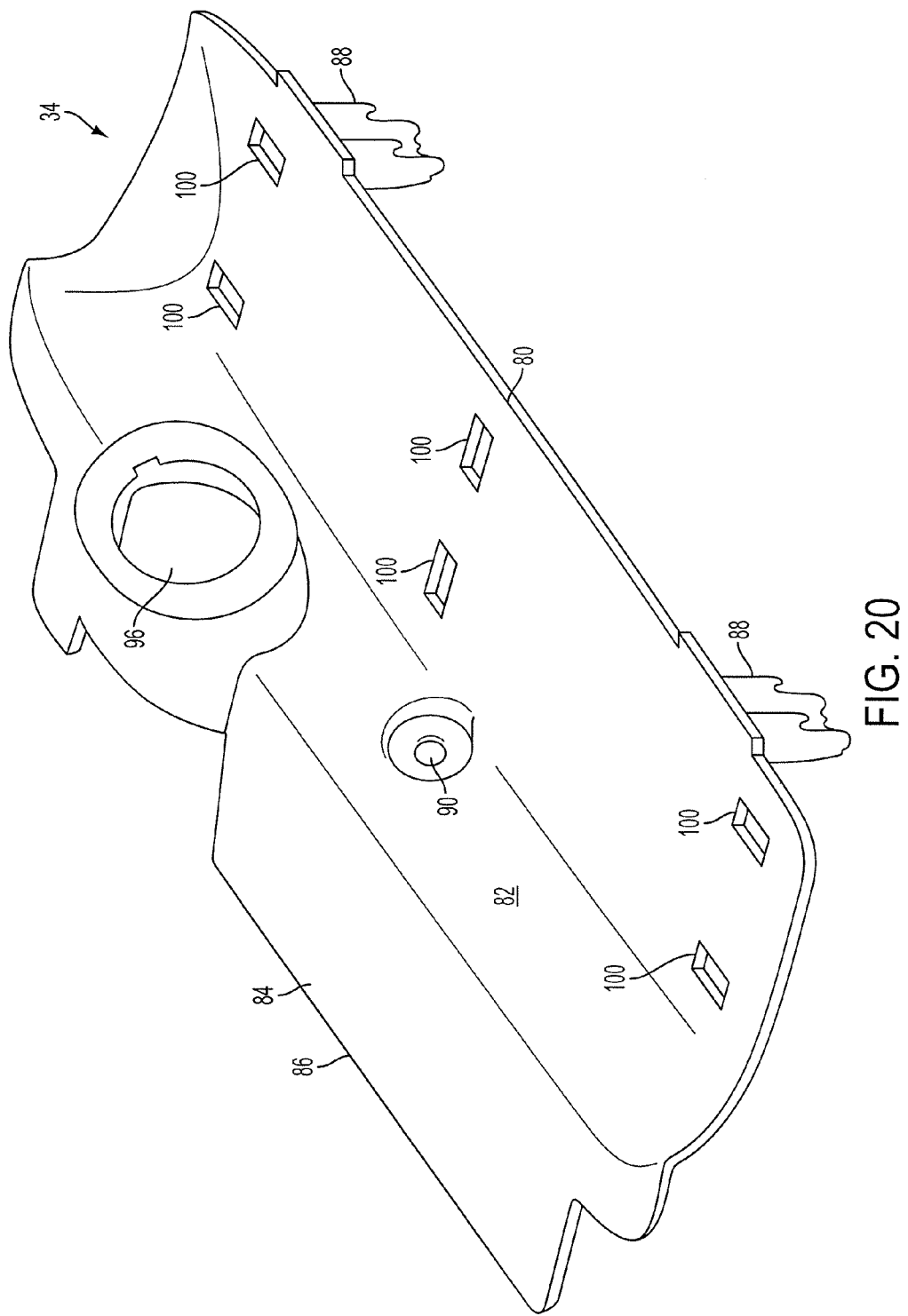
FIG. 20 is a front perspective view of the second trim member.
Figure 21:
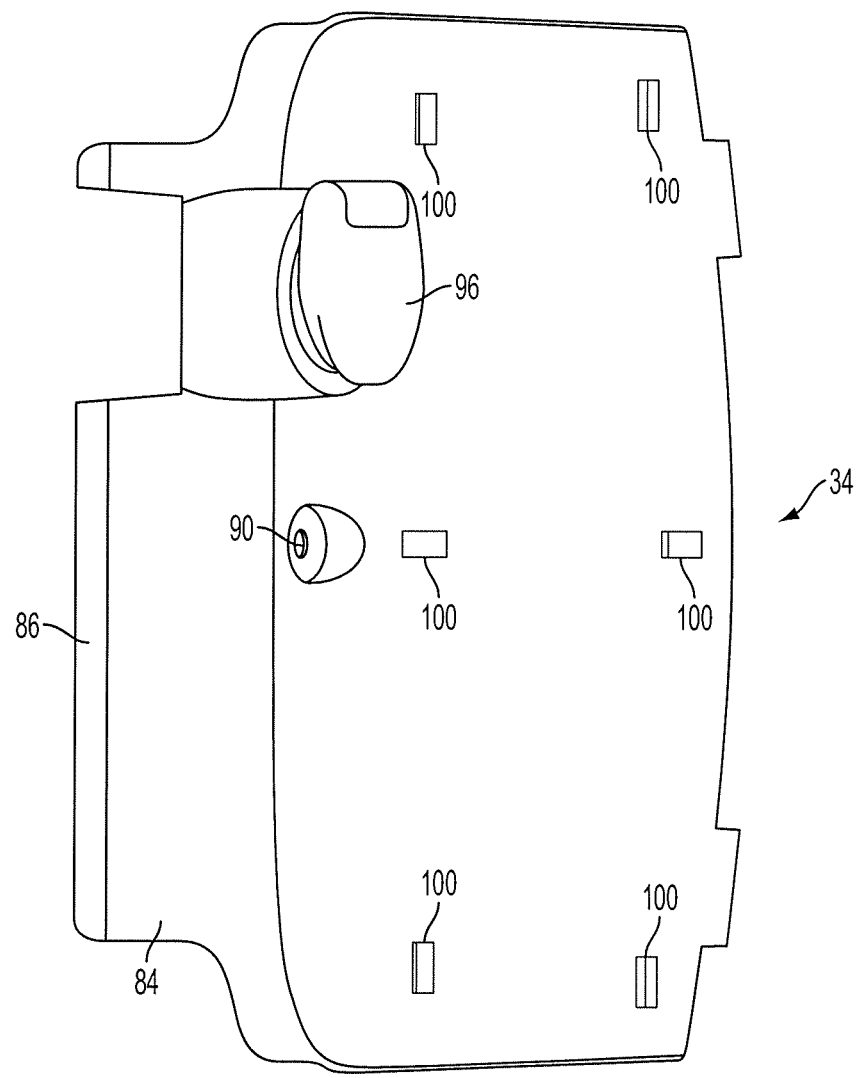
FIG. 21 is a top plan view of the second trim member.
Figure 22:
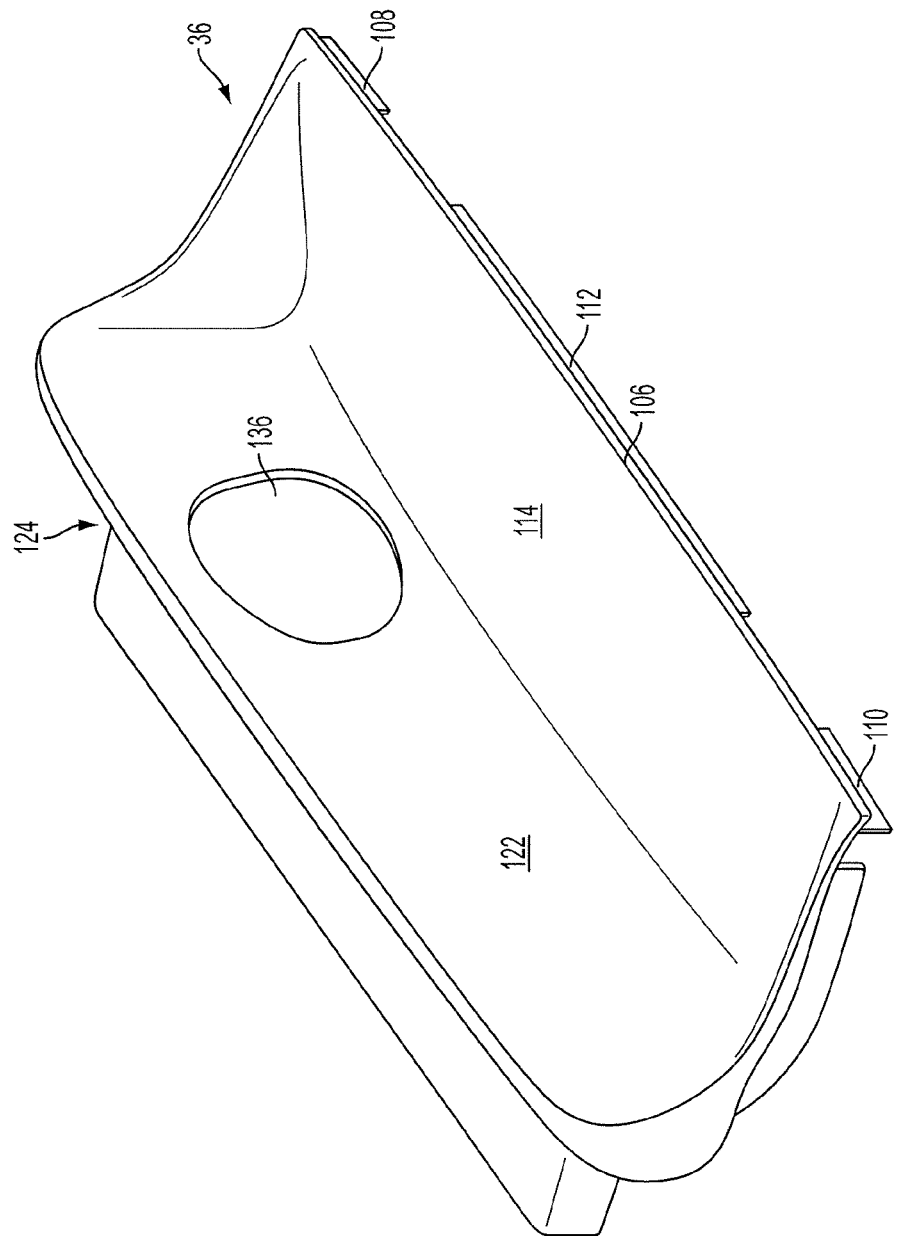
FIG. 22 is a front perspective view of the third trim member.
Figure 23:
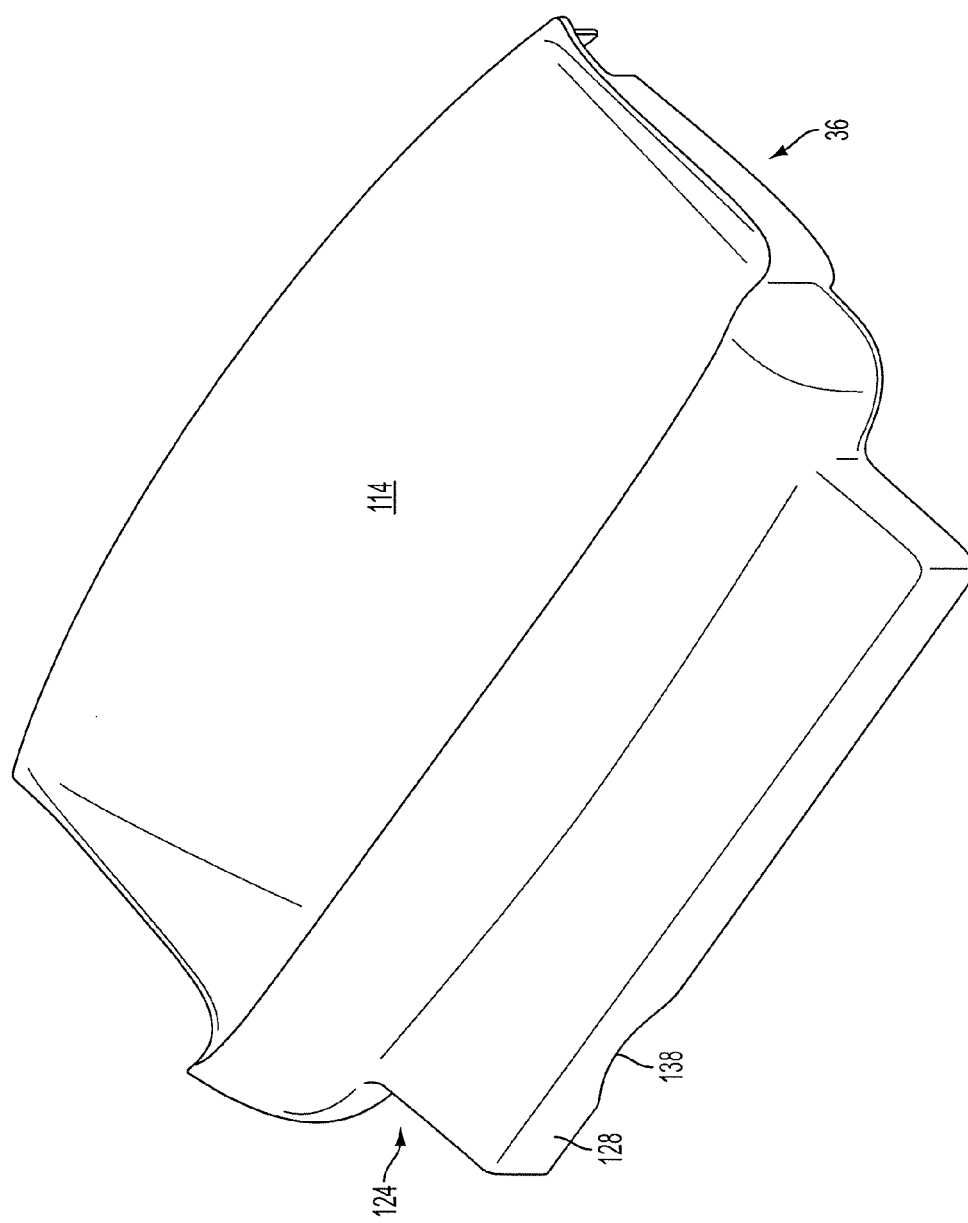
FIG. 23 is a rear perspective view of the third trim member.
Figure 24:
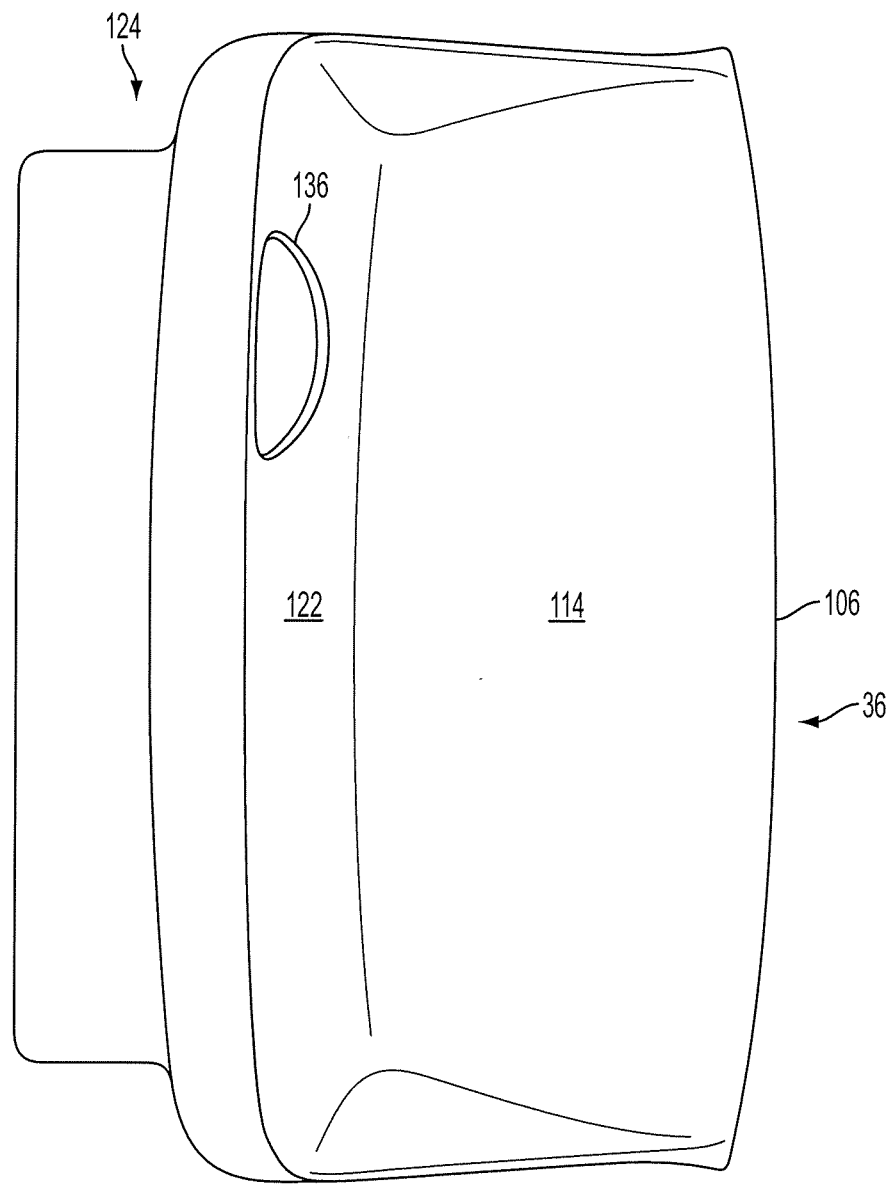
FIG. 24 is a top plan view of the third trim member.

As illustrated, for example, in FIG. 8, the second trim member 34 is positioned adjacent or proximate to the first trim member 32 such that the front peripheral edge 42 of the first trim member 32 faces the rear peripheral edge 80 of the second trim member 34. The second trim member 34 has a curved portion 82 that curves in a direction downward in the vehicle 10, and a front portion 84 that extends to a front edge 86. The second trim member 34 can be made of plastics, composites or any other suitable materials or combination of materials.

As further shown in FIGS. 17-21, the second trim member 34 further includes a plurality of mounting members 88, such as projections, which engage with corresponding openings in the base portion 20 by, for example, snap fitting to secure the second trim member 34 to the base portion 20. In addition, the second trim member 34 includes at least one opening 90 for receiving a fastening member 92. The fastening member 92 can be a screw, rivet or any other suitable fastening member that is received in an opening 94 in the base portion 20 to further secure the second trim member 34 to the base portion 20.

The second trim member 34 further defines an accessory outlet opening 96 through which extends an accessory outlet 98 of the vehicle 10. For example, the accessory outlet 98 can be a power connection point, a heating element, and/or a data communications port. Also, the second trim member 34 includes a plurality of apertures 100 which facilitate mounting of the third trim member 36 to the second trim member 34 as discussed below.

That is, as shown in FIGS. 2-9, 17-19 and 22-29, the third trim member 36, which is more elastic than the first and second trim members 32 and 34, is coupled to and at least partially overlays the second trim member 34. In this example, the third trim member 36 is made from an elastomeric material, such as rubber, or at least a portion of the third trim member 36 includes an elastomeric material. The third trim member 36 has a lower surface 102 that faces downward in the vehicle 10. The lower surface 102, which can also be referred to as a second surface, includes a second mounting structure 104. The second mounting structure 104 can be disposed at or proximate to a rear peripheral edge 106 of the third trim member 36. In this example, the front peripheral edge 42 of the first trim member 32 can be referred to as a first peripheral edge, the rear peripheral edge 80 of the second trim member 34 can be referred to as a second peripheral edge, and the rear peripheral edge 106 of the third trim member 36 can be referred to as a third peripheral edge.

In addition, the second mounting structure 104 can include at least one first projection 108, 110 and 112 positioned along the rear peripheral edge 106 of the third trim member 36 and extending away from the lower (second) surface 102 of the third trim member 36. Each projection 108, 110 and 112 can extend perpendicularly or substantially perpendicularly, or traversely, with respect to the lower surface 102. In this example, first projections 108 and 110 are located at opposite ends of the rear peripheral edge 106 of the third trim member 36. First projection 112 is located at the center of the rear peripheral edge 106 of the third trim member 36. Also, the second mounting structure 104 can be configured to include any suitable number of first projections. Alternatively, the second mounting structure 104 can be configured as a single first projection that extends entirely along the rear peripheral edge 106 of the third trim member 36, or along a portion of the peripheral edge 106 of the third trim member 36.

When the third trim member 36 is mounted to the first and second trim members 32 and 34, the rear peripheral edge 106 of the third trim member extends beyond the rear peripheral edge 80 of the second trim member 34 such that the second mounting structure 104 of the third trim member 36 engages the first mounting structure 40 of the first trim member 32. Also, the third trim member 36 has an upper surface 114 that is opposite to the lower surface 102. Accordingly, when the third trim member 36 is mounted to the first and second trim members 32 and 34, the upper surface 114, which can also be referred to as a third surface, is coplanar or substantially coplanar with the first surface 38 of the first trim member 32.

In addition, the first projections 108, 110 and 112 are received within the respective channels 50, 52 and 54 of the first mounting structure 40. Also, the second mounting structure 104 can include one first projection that is received within all of the channels 50, 52 and 54, or a different number of first projections that corresponds to the number of channels of the first mounting structure 40.

Figure 25:
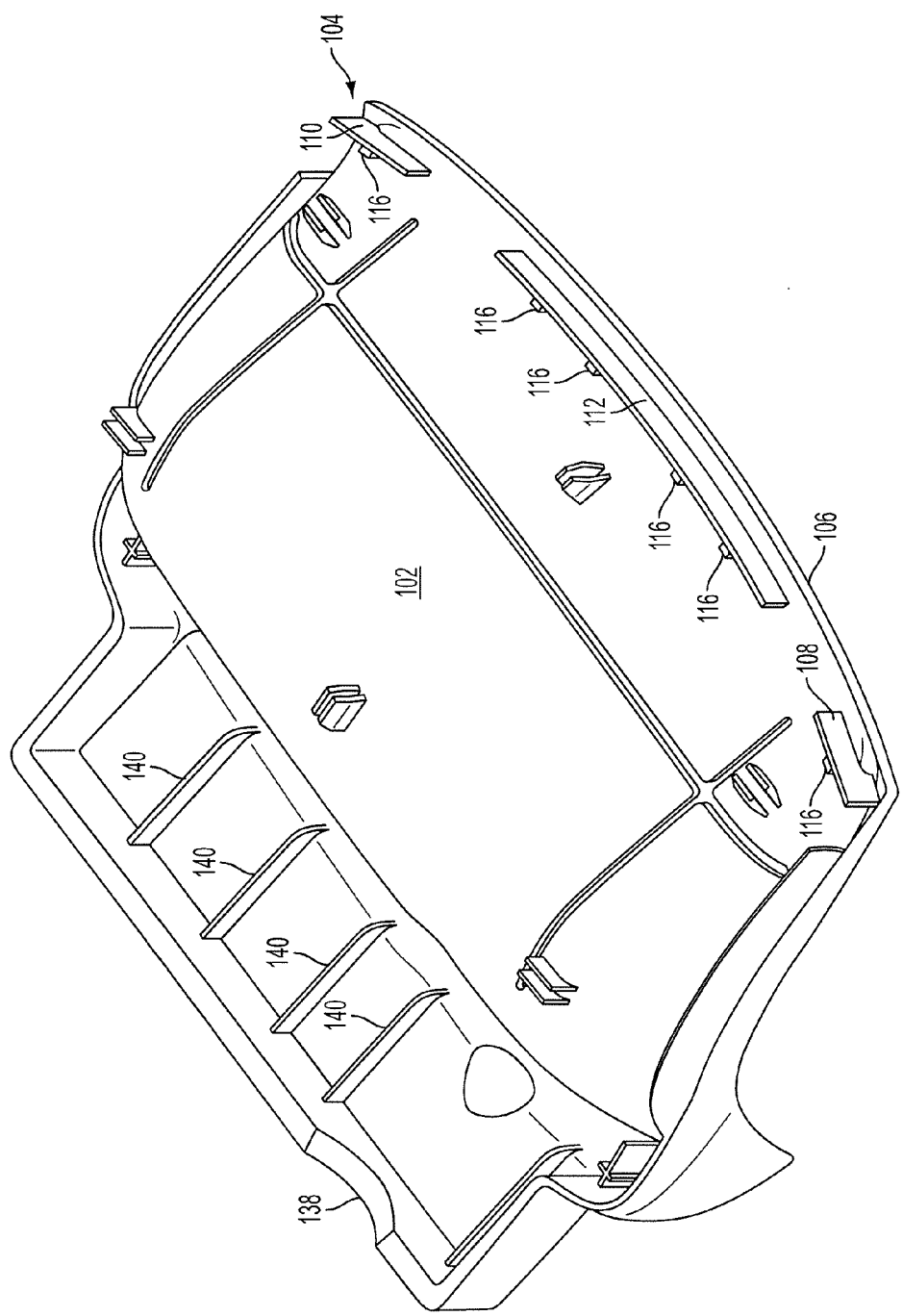
FIG. 25 is a bottom perspective view of the third trim member.
Figure 26:
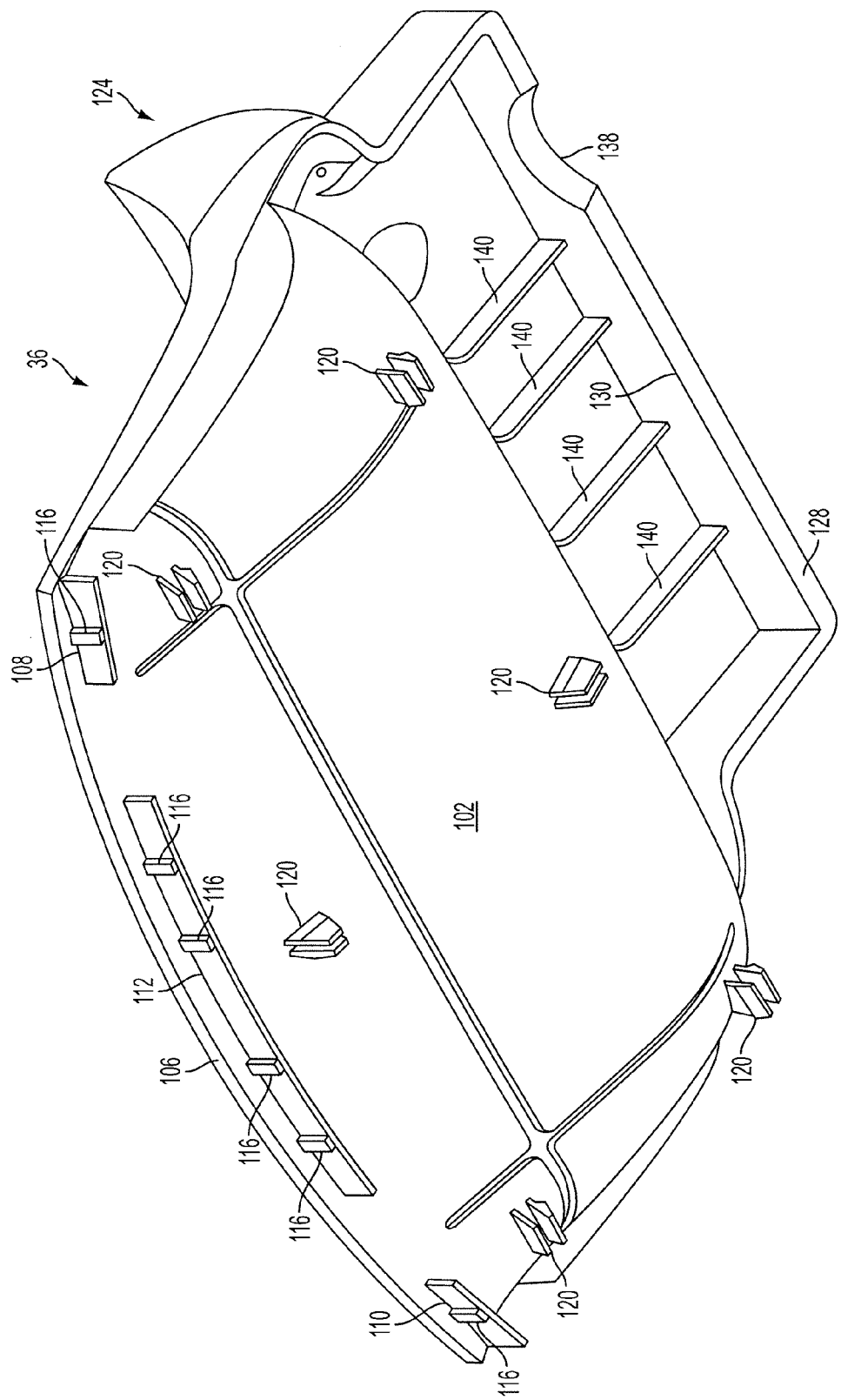
FIG. 26 is another bottom perspective view of the third trim member.
Figure 27:
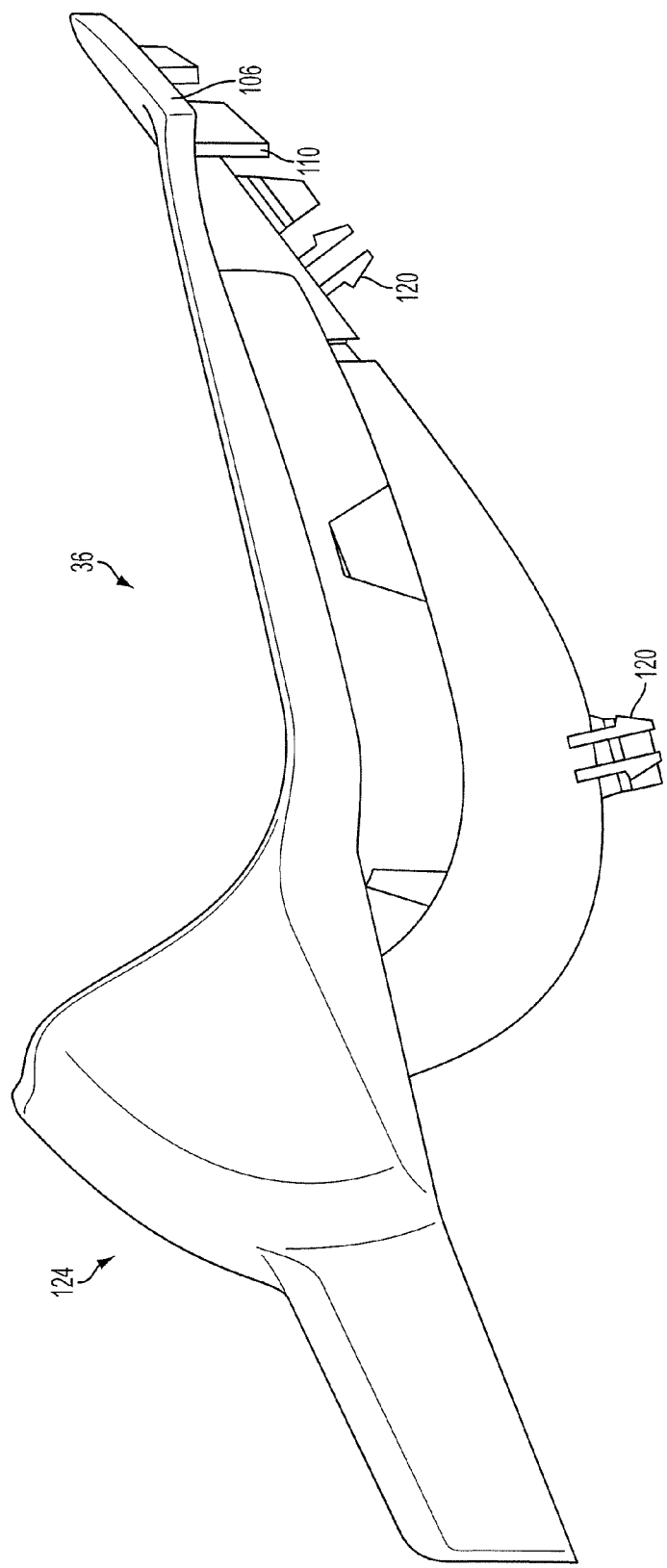
FIG. 27 is a side elevational view of the third trim member.
Figure 28:
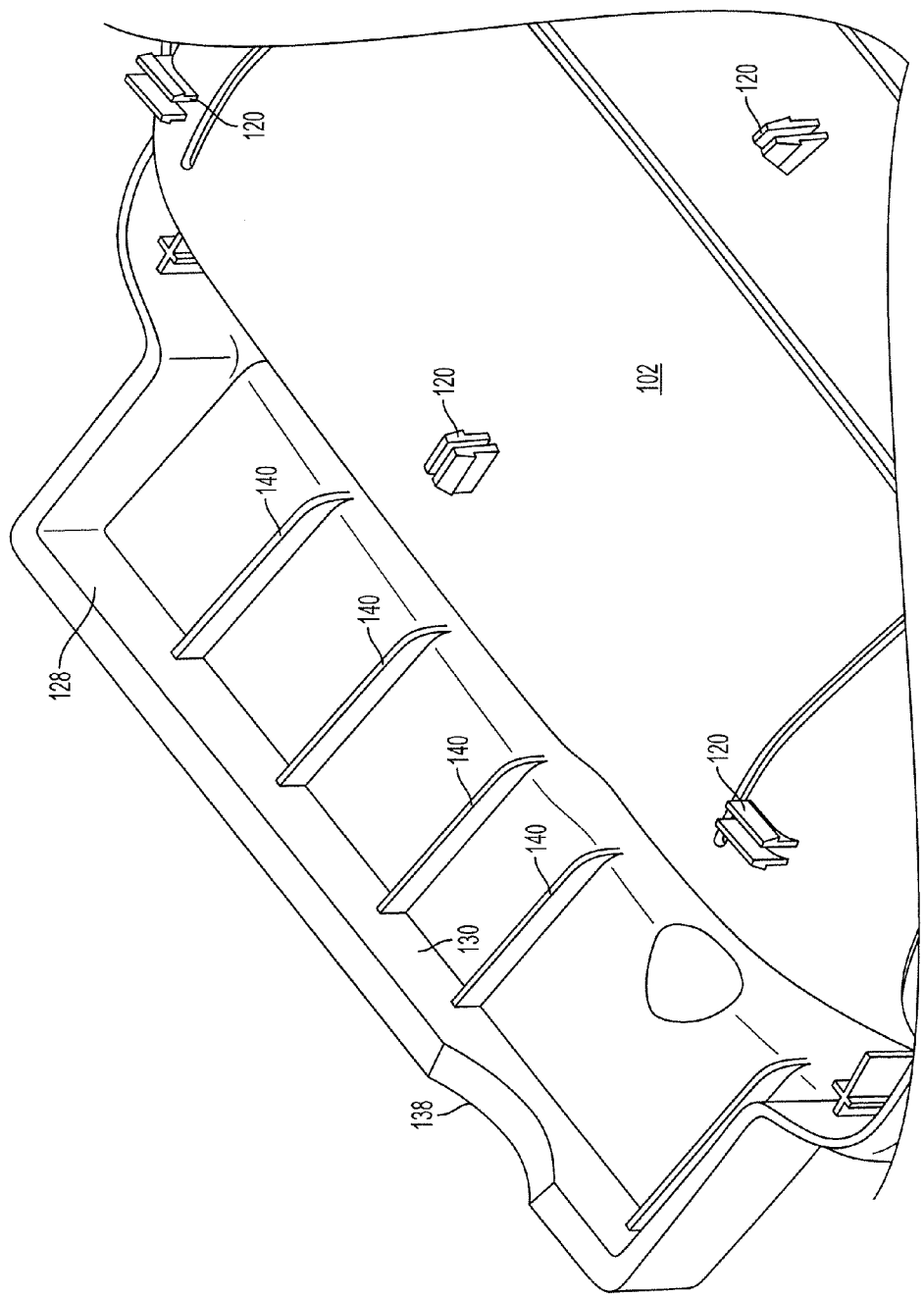
FIG. 28 is a detailed bottom perspective view of a front portion of the third trim member.
Figure 29:
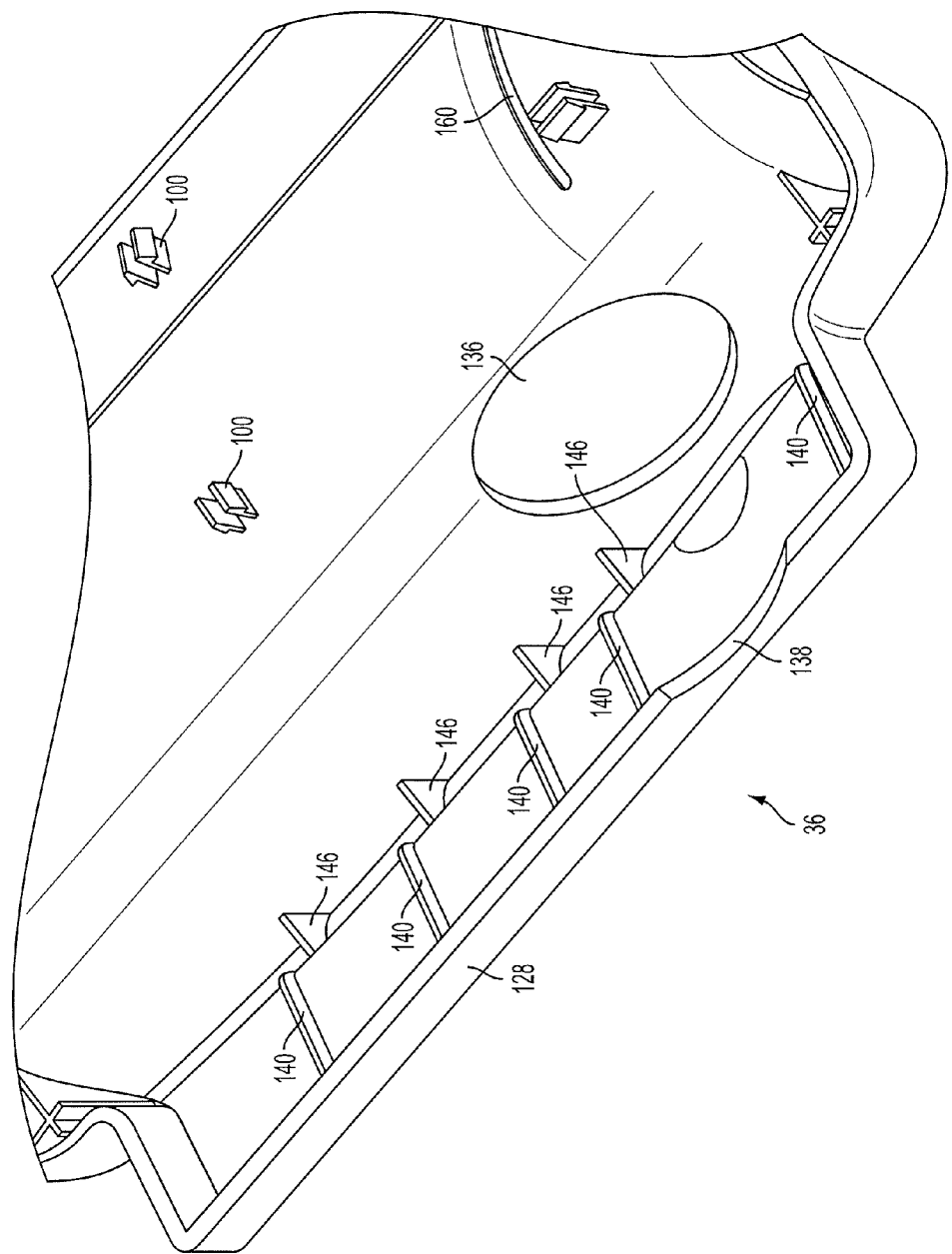
FIG. 29 is another detailed bottom perspective view of the front portion of the third trim member.

In addition, any or each first projections 108, 110 and 112 of the second mounting structure 104 can include a second projection 116 that extends from the first projection 110 and engages a sidewall 118 of a respective channel 50, 52 and 54 to create a tunable interference fit between the first and second mounting structures 40 and 104. Each second projection 116 can extend perpendicularly or substantially perpendicularly, or traversely, with respect to its corresponding first projection (e.g., first projection 110). Also, the number of second projections 116 need not correspond to the number of first projections. For example, any first projection 108, 110 or 112 can include multiple second projections 116. Also, the second projections 116 can be arranged such that they extend away from respective ones of the first projections 108, 110 and 112 in a forward direction of the vehicle 10 (as shown in FIG. 25), in a rear direction of the vehicle 10 (as shown in FIG. 26), and/or alternating ones of the second projections 116 can extend in opposite directions.

As further illustrated, the third trim member 36 includes a plurality of third mounting structures 120 that couple the third trim member 36 to the second trim member 34. Each third mounting structure 120 can be configured to pass through a respective aperture 100 defined by the second trim member 34 to create a snap-fit engagement between the second and third trim members 34 and 36. As indicated, a shape of a portion 122 of the third trim member 36 corresponds or substantially corresponds to a shape of the curved portion 82 to enable the third trim member 36 to snugly mate with the second trim member 34.

The third trim member 36 further includes a forward portion 124 that is positioned closer to a front of the vehicle than the rear (third) peripheral edge 106 of the third trim member 36. The forward portion 124 also extends vertically in the vehicle 10 higher than the rear peripheral edge 106. Furthermore, the forward portion 124 is positioned closer to a front of the vehicle 10 than the second trim member 34.

The forward portion 124 is further configured to define a cavity 126. That is, the forward portion 124 has a downward extending member 128 that extends downward in the vehicle 10 and includes an inner surface 130 which is adjacent or proximate to a front edge 132 of the second trim member 34 as shown, for example, in FIG. 8. Also, by extending upward in the vehicle 10, the forward portion 124 creates a rear surface 134 that extends above the second trim member 34 and faces rearward in the vehicle 10. The rear surface 134 defines an accessory outlet opening 136 that aligns with or substantially aligns with the accessory outlet opening 96 defined by the second trim member 34. Also, the downward extending member 128 can include a recess 138 that is also configured to accommodate a portion of the accessory outlet 98 of the vehicle 10. Accordingly, the accessory outlet openings 96 and 134 of the second and third trim members 34 and 36 form an accessory outlet opening that at least partially extends through the rear surface 134 and the cavity 126, and through which extends the accessory outlet 98 of the vehicle 10.

As further illustrated, the third trim member 36 includes at least one stiffening rib 140 that is adjacent to the inner surface 130 and extends downwardly in the vehicle 10. As indicated, each stiffening rib 140 is positioned between the lower surface 102 of the third trim member 36 and an upper surface 142 of the second trim member 34 that faces the lower surface 102. In this example, each stiffening rib 140 can extend downwardly from the lower surface 102 of the third trim member 36 within the cavity 126 and contact or be proximate to the upper surface 142 of the second trim member 34 to maintain a gap 144 between the second and third trim members 34 and 36, respectively. Furthermore, at least one additional stiffening rib 146 can extend downward from the lower surface 102 of the third trim member 36 in the upper portion 148 of the cavity 126. These additional stiffening ribs 146 can contact or be proximate to an upper surface 150 of a portion of the second trim member 34 that defines the accessory outlet opening 96 of the second trim member 34. Also, the additional stiffening ribs 146 can be positioned adjacent to the rear wall 134 (as shown in FIG. 8) in order to provide increased structural rigidity. Accordingly, the stiffening ribs 140, the additional stiffening ribs 146 and the third mounting structures 120 can function to maintain the shape of the third trim member 36. For example, the stiffening ribs 140, the additional stiffening ribs 146 and the third mounting structures can minimize or altogether prevent warping of the third trim member 36 that can otherwise occur due to operation of the vehicle 10 across a range of temperatures and environmental conditions.

An added benefit of the third trim member 36 having elastic properties relates to the ability of the third trim member 36 to absorb or account for a range of manufacturing tolerance variations. For example, since the first and second trim members 32 and 34, respectively, are separate components that are fixed to one another, it is possible for the gap between the front peripheral edge 42 of the first trim member 32 and the rear peripheral edge 80 of the second trim member 34 to vary slightly from one console assembly to another. The elastic properties of the third trim member 36 allow the rear peripheral edge 106 of the third trim member 36 to stretch rearward slightly during installation (i.e., when making the connection between the first mounting structure 40 and the second mounting structure 104). For example, the third trim member 36 can be designed to be stretch 1.2 mm or more rearward at the rear peripheral edge 106 during installation of the third trim member 36, thus achieving a high degree of reliability with respect to fit and finish within the vehicle 10.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle interior trim assembly comprising:
a first trim member having a first surface which faces upward in a vehicle including the vehicle interior trim assembly and includes a first mounting structure;
a second trim member positioned adjacent to the first trim member such that a first peripheral edge of the first trim member faces a second peripheral edge of the second trim member, the second trim member having a second surface which faces upward in the vehicle; and
a third trim member which has an elasticity that is greater than an elasticity of the first and second trim members and is coupled to and at least partially overlays the second surface of the second trim member such that the third trim member is above the second surface of the second trim member, the third trim member having a third surface including a second mounting structure, and a third peripheral edge of the third trim member extends beyond the second peripheral edge of the second trim member such that the third trim member is positioned over the first peripheral edge of the first trim member and the second peripheral edge of the second trim member and the second mounting structure of the third trim member engages the first mounting structure of the first trim member.

2. The vehicle interior trim assembly according to claim 1, wherein
the third trim member includes an elastomeric material.

3. The vehicle interior trim assembly according to claim 1, wherein
the third trim member has a third surface that is opposite the second surface and is substantially coplanar with the first surface of the first trim member.

4. The vehicle interior trim assembly according to claim 1, wherein
the first mounting structure includes a channel; and
the second mounting structure includes a first projection that extends away from the second surface of the third trim member and is received within the channel.

5. The vehicle interior trim assembly according to claim 4, wherein
the second mounting structure further includes a second projection that extends perpendicularly from the first projection and engages a sidewall of the channel to create an interference fit between the first and second mounting structures.

6. The vehicle interior trim assembly according to claim 1, wherein
the third trim member includes a third mounting structure that couples the third trim member to the second trim member.

7. The vehicle interior trim assembly according to claim 6, wherein
the third mounting structure passes through an aperture defined by the second trim member to create a snap-fit engagement between the second and third trim members.

8. The vehicle interior trim assembly according to claim 1, wherein
the third trim member includes a forward portion that is positioned closer to a front of a vehicle including the vehicle interior trim assembly than the third peripheral edge of the third trim member, and the forward portion extends vertically higher in the vehicle than does the third peripheral edge.

9. The vehicle interior trim assembly according to claim 1, wherein
the second trim member has a curved portion and a shape of a portion of the third trim member substantially corresponds to a shape of the curved portion.

10. The vehicle interior trim assembly according to claim 1, wherein
the third trim member includes a forward portion that is positioned closer to a front of a vehicle including the vehicle interior trim assembly than the second trim member.

11. The vehicle interior trim assembly according to claim 10, wherein
the forward portion has a downward extending member that extends downward in the vehicle and includes an inner surface which is adjacent to a front edge of the second trim member.

12. The vehicle interior trim assembly according to claim 1, wherein
the second and third trim members define an accessory outlet opening through which extends an accessory outlet of a vehicle including the vehicle interior trim assembly.

13. The vehicle interior trim assembly according to claim 1, wherein
the third trim member includes a portion that defines a cavity.

14. The vehicle interior trim assembly according to claim 13, wherein
the second and third trim members define an accessory outlet opening that at least partially extends through the cavity and through which extends an accessory outlet of a vehicle including the vehicle interior trim assembly.

15. The vehicle interior trim assembly according to claim 1, wherein
the third trim member includes a portion that extends upward in a vehicle including the vehicle interior trim assembly to create a rear surface that extends above the second trim member and faces rearward in the vehicle.

16. The vehicle interior trim assembly according to claim 15, wherein
the second and third trim members define an accessory outlet opening that at least partially extends through the rear surface and through which extends an accessory outlet of a vehicle including the vehicle interior trim assembly.

17. The vehicle interior trim assembly according to claim 15, wherein
the third trim member includes a stiffening rib extending downwardly in the vehicle from the second surface of the third trim member and positioned adjacent to the rear surface.

18. A vehicle interior trim assembly comprising:
a first trim member having a first surface which includes a first mounting structure;
a second trim member positioned adjacent to the first trim member such that a first peripheral edge of the first trim member faces a second peripheral edge of the second trim member; and
a third trim member which is more elastic than the first and second trim members and is coupled to and at least partially overlays the second trim member, the third trim member having a second surface including a second mounting structure, and a third peripheral edge of the third trim member extends beyond the second peripheral edge of the second trim member such that the second mounting structure of the third trim member engages the first mounting structure of the first trim member, the third trim member including a forward portion that is positioned closer to a front of a vehicle including the vehicle interior trim assembly than the second trim member and a stiffening rib extending downwardly in the vehicle from the second surface of the third trim member and positioned between the second surface of the third trim member and a third surface of the second trim member that faces the second surface.

19. The vehicle interior trim assembly according to claim 17, wherein
the stiffening rib is configured to maintain a gap between the second trim member and the forward portion of the third trim member.

20. A vehicle interior trim assembly comprising:
a first trim member having a first surface which includes a first mounting structure;
a second trim member positioned adjacent to the first trim member such that a first peripheral edge of the first trim member faces a second peripheral edge of the second trim member; and
a third trim member which is more elastic than the first and second trim members and is coupled to and at least partially overlays the second trim member, the third trim member having a second surface including a second mounting structure, and a third peripheral edge of the third trim member extends beyond the second peripheral edge of the second trim member such that the second mounting structure of the third trim member engages the first mounting structure of the first trim member, the third trim member including a stiffening rib extending downwardly in the vehicle from the second surface of the third trim member and positioned between the second surface of the third trim member and a third surface of the second trim member that faces the second surface.

\* \* \* \* \*